US012307880B2

(12) United States Patent
Dearman et al.

(10) Patent No.: US 12,307,880 B2
(45) Date of Patent: May 20, 2025

(54) SYSTEMS AND METHODS FOR DETERMINING STATUS OF SENSORS

(71) Applicant: Comcast Cable Communications, LLC, Philadelphia, PA (US)

(72) Inventors: Lewis Dearman, Austin, TX (US); Paul De La Rosa, Pflugerville, TX (US); Darrell Fuquay, Dripping Springs, TX (US); Jon Watt, Austin, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 192 days.

(21) Appl. No.: 17/898,285

(22) Filed: Aug. 29, 2022

(65) Prior Publication Data

US 2024/0071206 A1 Feb. 29, 2024

(51) Int. Cl.
*G08B 29/26* (2006.01)
*G08B 29/22* (2006.01)

(52) U.S. Cl.
CPC ............. *G08B 29/26* (2013.01); *G08B 29/22* (2013.01)

(58) Field of Classification Search
CPC ................................ G08B 29/26; G08B 20/22
See application file for complete search history.

(56) References Cited

U.S. PATENT DOCUMENTS 5,239,684 A 8/1993 Ishikura
5,256,960 A 10/1993 Novini
7,092,688 B2 8/2006 Lee et al.
7,633,388 B2 12/2009 Simon et al.
RE41,183 E 3/2010 Najafi et al.
9,626,858 B2 4/2017 Sloo et al.
9,739,846 B2 8/2017 Petrie et al.
9,767,660 B1 * 9/2017 Skarda .................. G01D 5/145
9,933,243 B2 * 4/2018 Thibault .................. G01B 7/14
10,107,872 B2 * 10/2018 Stephanson ............ G01R 35/00
10,130,822 B2 * 11/2018 Legay .................. A61N 1/3925
2006/0136131 A1 * 6/2006 Dugan .................. G07B 15/02 705/13
2007/0139195 A1 * 6/2007 Jin ......................... G08B 13/08 340/547

(Continued)

OTHER PUBLICATIONS

Nov. 2019—Silicon Labs: Si7210 I2C Hall Effect Magnetic Position and Temperature Sensor Data Sheet.

(Continued)

*Primary Examiner* — Steven Lim
*Assistant Examiner* — Son M Tang
(74) *Attorney, Agent, or Firm* — Banner & Witcoff, Ltd.

(57) ABSTRACT

Systems, apparatuses, and methods are described for monitoring objects. A sensor positioned on an object (e.g., a door) is configured to measure a strength of a magnetic field of a magnet positioned on an associated object (e.g., the door frame). The measurements of the strength of the magnetic field made by the sensor may change over time (e.g., may decrease) due to changes in the positioning or alignment of the sensor or magnet. The positioning or alignment of the sensor or magnet may change due to use of the object (e.g., use of the door). One or more thresholds used by the sensor to determine the status of an object (e.g., to determine whether the door is open or closed) may be adjusted based on changes to the measurements over time.

20 Claims, 10 Drawing Sheets

(56) References Cited

U.S. PATENT DOCUMENTS

| | | | | |
|---|---|---|---|---|
| 2007/0183413 | A1* | 8/2007 | Zusman | H01H 35/14 370/368 |
| 2008/0094240 | A1* | 4/2008 | Haberer | F16P 3/145 340/686.1 |
| 2009/0140858 | A1 | 6/2009 | Gore et al. | |
| 2015/0348385 | A1* | 12/2015 | Lamb | G08B 29/20 340/547 |
| 2016/0165323 | A1* | 6/2016 | Hollis | H04Q 9/00 340/870.16 |
| 2016/0187118 | A1* | 6/2016 | Modi | G08B 5/36 340/815.45 |
| 2016/0219141 | A1 | 7/2016 | Kant | |
| 2016/0298950 | A1* | 10/2016 | Modi | G01B 7/14 |
| 2017/0176187 | A1* | 6/2017 | Ishihama | G01C 21/08 |
| 2017/0336832 | A1* | 11/2017 | Furlong | G01D 5/145 |
| 2019/0051129 | A1* | 2/2019 | Hunt | G08B 13/08 |
| 2019/0187283 | A1* | 6/2019 | Kathan | G01S 17/88 |
| 2020/0229281 | A1 | 7/2020 | Liu et al. | |
| 2020/0389040 | A1 | 12/2020 | Deng | |
| 2024/0190306 | A1* | 6/2024 | Lee | B60N 2/0244 |

OTHER PUBLICATIONS

Dec. 2019—Zigbee Alliance—Cluster Library Specification Document 07-5123 Revision 8 Chapter Document 14-0125.

* cited by examiner

600

SYSTEMS AND METHODS FOR DETERMINING STATUS OF SENSORS

BACKGROUND

A security system may rely on a sensor to report information. Over time, information reported by the sensor may become unreliable. Thus, there is a need to improve the reliability of information reported by a sensor over its lifetime.

SUMMARY

The following summary presents a simplified summary of certain features. The summary is not an extensive overview and is not intended to identify key or critical elements.

Systems, apparatuses, and methods are described for monitoring objects (e.g., a door or a window) to determine whether a security event is occurring with respect to the object (e.g., determining whether the door or window is open if the door or window should be closed). In one aspect, a sensor may be positioned on the object (e.g., the door) and an associated magnet may be placed in relatively close proximity to the sensor (e.g., the door frame). The sensor may be configured to detect a magnetic field of the magnet and to measure a strength of the magnetic field. The measured strength of the magnetic field may be compared to a threshold to determine if the door is open or closed. As the positioning of the sensor and/or the magnet changes over time, measurements made by the sensor of the strength of the magnetic field may also change. The threshold for determining whether the door is open or closed may be adjusted (e.g., increased or decreased) to account for changes in the measurements of the strength of the magnetic field made by the sensor. In doing so, false determinations that the door is open when in fact the door is closed may be avoided and/or false determinations that the door is closed when in fact the door is open may be avoided.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
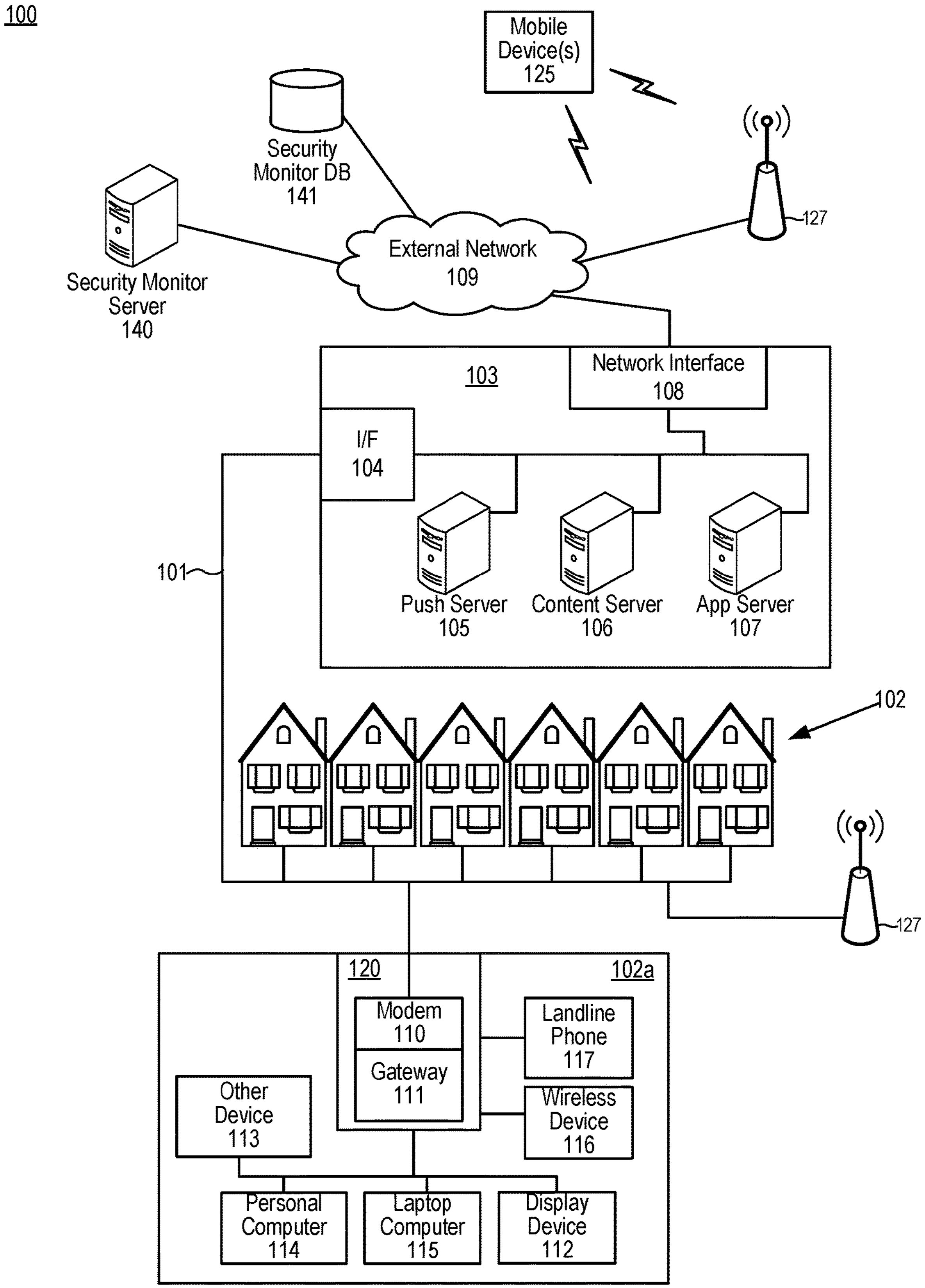
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

A security monitoring system may comprise a sensor and a remote controller. The remote controller may be located remote or apart from the sensor or the sensor may be an integrated part of the remote controller. The sensor may be positioned on a door (or a window) and an associated magnet may be positioned on a corresponding door frame (or a corresponding window frame). Alternatively, the sensor may be positioned on the door or window frame, and the magnet may be positioned on the door or window. The sensor may be a Hall effect sensor configured to measure a strength of a magnetic field from the magnet. The measured strength of the magnetic field may be reported to the remote controller. The sensor and/or the remote controller may compare the measured strength of the magnetic field to one or more thresholds to determine if the door (or window) is open or closed. The sensor and/or the remote controller may track measurements of the magnetic field strength made over time when the door (or window) is closed. The sensor and/or the remote controller may adjust the one or more thresholds based on trends in the measurements of the magnetic field strength. For example, a threshold may be lowered based on a changed position of the sensor or the magnet, which may result in a lower measured magnetic field strength if the door is closed. By adjusting the threshold to account for changes in the positioning and/or alignment of the sensor or magnet over time due to normal wear and tear on the door (or window), the security monitoring system may avoid falsely indicating that the door (or window) is open if the door is actually closed. Similarly, a threshold may be increased based on a changed position of the sensor or the magnet, which may result in an increased measured magnetic field strength if the door is closed. By adjusting the threshold to account for changes in the positioning and/or alignment of the sensor or magnet over time due to normal wear and tear on the door (or window), the security monitoring system may also avoid falsely indicating that the door (or window) is closed if the door is actually open.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers in communication with other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (and/or an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Also or alternatively, one or more servers may be part of the external network 109 and may be configured to communicate (e.g., via the local office 103) with computing devices located in or otherwise associated with one or more premises 102 and/or with mobile devices 125.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise (and/or otherwise perform operations of) a set-top box (STB), digital video recorder (DVR), a digital transport adapter (DTA), a computer server, a router, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, process, and/or otherwise use data associated with content items. A content item may comprise a video, a game, one or more images, software, audio, text, webpage(s), and/or other type of content. One or more types of data may be associated with a content item. A content item may, for example, be associated with media data (e.g., data encoding video, audio, and/or images) that may be processed to cause output of the content item via a display screen, a speaker, and/or other output device component.

The other devices 113 may comprise a sensor (e.g., a Hall effect sensor) that may be configured to detect if a door or a widow (or other object) is opened or closed. The other devices 113 may also comprise a remote controller that may be configured to communicate with the sensor over a network such as, for example, a network within the premises 102*a* (e.g., via wireless device 116). The sensor may communicate information related to security events detected by the sensor to the remote controller. Security events may comprise detecting if a door or a window is opened and/or if a door or a window is closed. The remote controller may be configured to monitor operation of the sensor and/or to adjust or modify operation of the sensor. The remote controller and the sensor may be separate devices or may be integrated to form one physical device (e.g., the sensor may be a part of the controller).

The remote controller may be further configured to communicate information related to security events to one or more of the mobile devices 125 via, for example, the wireless access points 127 and/or the wireless device 116 (e.g., a wireless router). A user of the mobile device 125 may be able to monitor a security of the premises 125 based on operation of the sensor and the remote controller. As described above, one or more servers may be communicatively coupled to the external network 109. For example, a security monitoring server 140 may communicate with the local office 103 (and/or one or more other local offices), one or more premises 102, one or more access points 127, one or more mobile devices 125, and/or one or more other computing devices via the external network 109. The security monitor server 140 may monitor and control operations of the sensor and/or the remote controller based on user preferences and settings. The security monitor server 140 may also enable the mobile devices 125 to receive alerts related to security events detected by the sensor and/or the remote controller if the mobile devices 125 are located remote from the premises 125*a*.

Also or alternatively, the security monitor server 140 may be located in the local office 103, in a premises 102, and/or elsewhere in a network. The security monitor server 140 may communicate with a security monitor database 141. The security monitor database 141 may store data that may be used in connection with security event monitoring operations performed by the security monitor server 140, the sensor, and/or the remote controller. For example, data may be maintained for use in establishing default security monitoring operations and alert settings of security monitor server 140, the sensor, and/or the remote controller, as desired by a user of the mobile device 125. Although shown as a separate element, the security monitor database 141 may be part of the security monitor server 140. Also or alternatively, the push server 105, the content server 106, the application server 107, the security monitor server 140, and/or other server(s) may be combined. The servers 105, 106, 107, and 140, other servers, and/or the security monitor database 141 may be computing devices and may comprise memory storing data and also storing computer executable instructions that, when executed by one or more processors, cause the server(s) to perform steps described herein.

Any component depicted and described in relation to FIG. 1—including, for example, the sensor, the remote controller, the mobile devices 125, the security monitor server 140, and/or the security monitor database 141—may form a security monitoring system (e.g., a security system) or a portion thereof, as further described herein. The security monitoring system may detect and report security events to a user based on preferences specified by the user.

Figure 2:
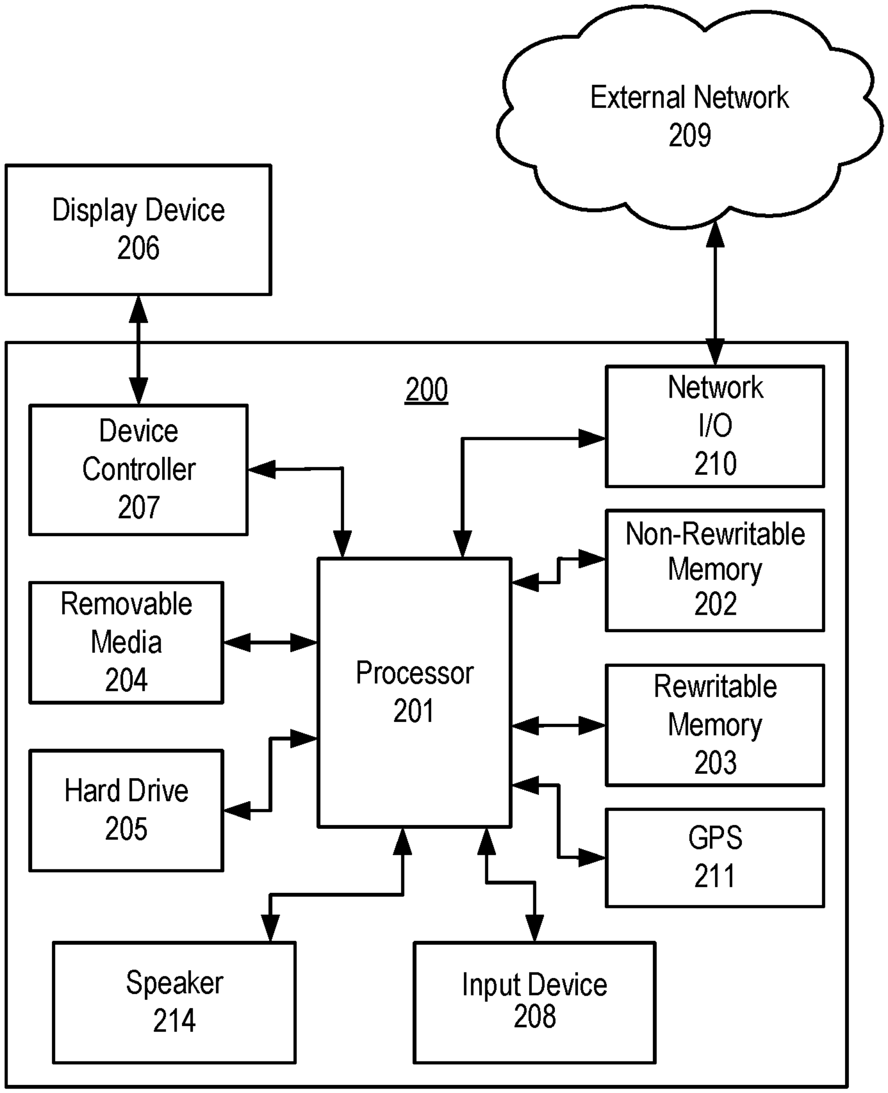
FIG. 2 shows example components of a computing device.

FIG. 2 shows hardware elements of a computing device 200 that may be used to implement any of the computing devices shown or described in relation to FIG. 1 (e.g., the mobile devices 125, any of the devices shown in the premises 102*a*, any of the devices shown in the local office 103, any of the wireless access points 127, the security monitor server 140, the security monitor 141, any devices that are part of or associated with the external network 109) and any other computing devices discussed herein (e.g., a remote control unit associated with the gateway 111 and/or with another computing device). The computing device 200 may be used to implement the sensor and or the remote controller described in relation to FIG. 1 (e.g., as one or more other devices 113). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output components, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), a microphone, etc. The computing device 200 may, for example receive sounds of speech input via a microphone. The processor 201 may (e.g., using one or more analog-to-digital (A/D) converters, digital signal processors (DSPs), and/or other components) digitize and/or otherwise generate audio data that is representative of the speech input. Also or alternatively, the computing device may comprise (e.g., in addition to the processor 201) one or more A/D converters, DSPs, and/or other components that generate audio data that is representative of the speech input. The processor 201 and/or other components of the computing device may send speech data to one or more other computing devices, may receive (e.g., via network input/output (I/O) interface 210, described below) speech data generated by another computing device, may perform speech recognition processing of speech data, and/or may perform other operations associated with speech data.

The computing device 200 may also comprise one or more network interfaces, such as the network I/O interface 210 (e.g., a network card), to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
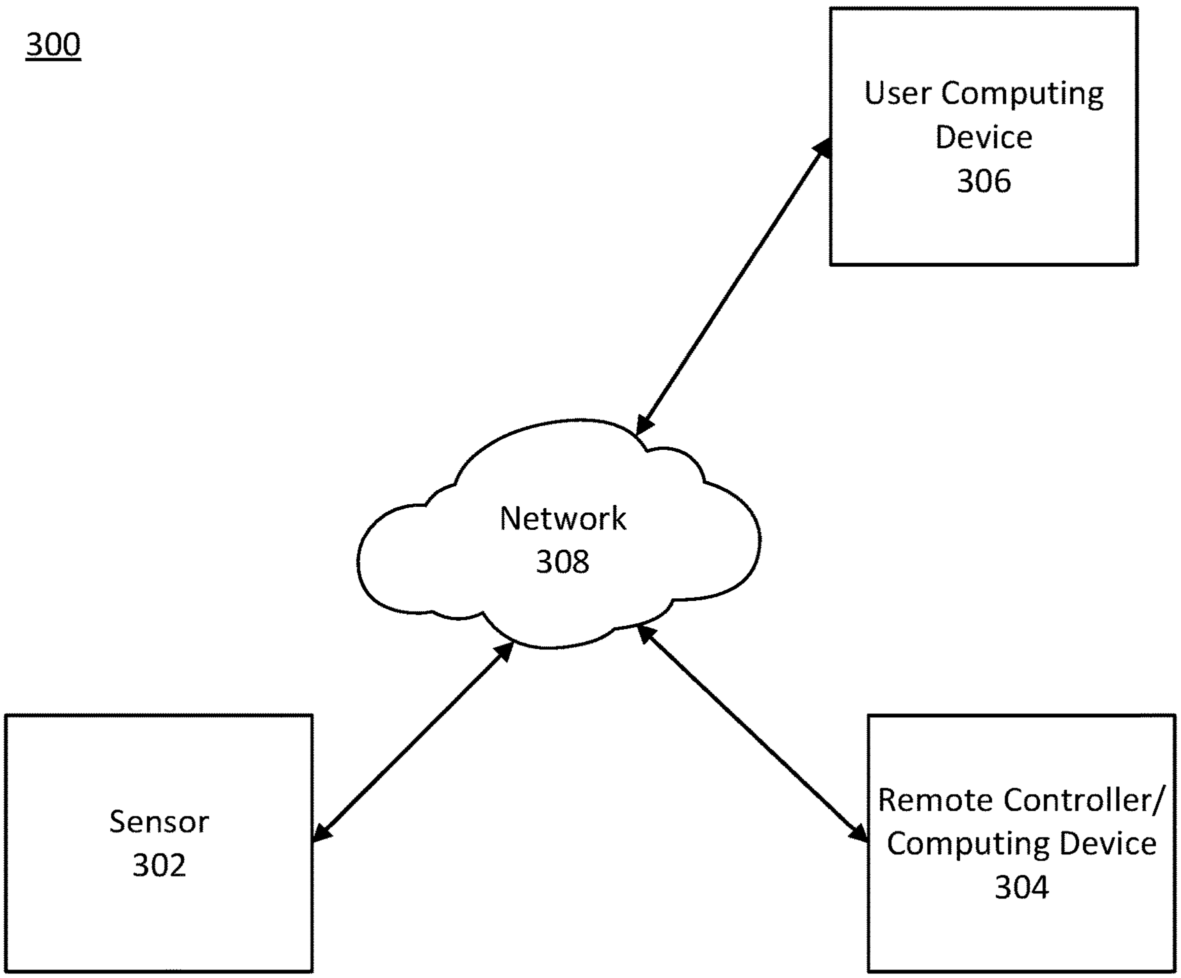
FIG. 3 shows an example security monitoring system.

FIG. 3 shows a system 300 for monitoring security events. The system 300 may comprise a security system or a portion thereof. The system 300 may comprise a sensor 302, a remote controller 304, a user device 306, and a network 308. The system 300 may comprise one or more components depicted and described in relation to FIG. 1. For example, the sensor 302 may comprise one of the other devices 113, the remote controller 304 may comprises one of the other devices 113, the user device 306 may comprise one of the mobile devices 125 or one of the wireless devices 116, and the network 308 may comprise a network provided by one of the wireless devices 116 and/or one of the wireless access points 127 and may include the external network 109. The system 300 may be a portion of the communications network 100 depicted in FIG. 1.

The sensor 302 may comprise any type of sensor including, for example, a Hall effect sensor (or Hall sensor). The sensor 302 may be positioned anywhere within a premises (e.g., the premises 102*a*). The sensor 302 may be positioned so as to detect a movement of any item or object within the premises and/or to detect a change in a position of any item or object within the premises. As a first example, the sensor 302 may be positioned on a door to detect if the door is open or if the door is closed. As a second example, the sensor 302 may be positioned on a window to detect if the window is open or if the window is closed.

The sensor 302 may be configured to detect a magnetic field and to output an indication of a strength of the magnetic field (e.g., output an indication of a measured magnetic flux density). For example, the sensor 302 may output a signal (e.g., a voltage signal) indicating a strength of the magnetic field. The output signal may vary according to a strength of the magnetic field. For example, the sensor 302 may be positioned on a door and an associated magnet may be positioned on a door frame. If the door is closed, the sensor 302 may be in relatively close proximity to the magnet. As a result, the sensor 302 may detect a relatively strong magnetic field and may output a first signal indicating detection of the relatively strong magnetic field. The first output signal may be interpreted as indicating that the door is closed. If the door is open, the sensor 302 may no longer be in relatively close proximity to the magnet. As a result, the sensor 302 may detect a relatively weak magnetic field and may output a second signal indicating detection of the relatively weak magnetic field. The second output signal may be interpreted as indicating that the door is open.

The sensor 302 may comprise a computing device such as, for example, the computing device 200. The sensor 302 may comprise one or more processors and a memory. The sensor 302 may comprise a battery to power the sensor 302. As described above, the sensor 302 may be associated with a magnet. The sensor 302 may be positioned on a moveable item (e.g., the moveable portion of a door or a window) while the magnet may be positioned on an associated immovable item (e.g., a door frame or a window frame) that is in relatively close proximity to the sensor 302.

The remote controller 304 may be positioned anywhere within the premises (e.g., the premises 102*a*). The remote controller 304 may be positioned remote from the sensor 302 and may be configured to communicate with the sensor 302 over the network 306. The remote controller 304 and the sensor 302 may communicate wirelessly or over a wired link provided by the network 308. The remote controller 304 and the sensor 302 may be separate devices or may be integrated to form one physical device (e.g., the sensor 302 may be a part of the remote controller 304). If the remote controller 304 and the sensor 302 are integrated to form one physical device, then the functionality of the remote controller 304 as described herein may comprised in the sensor 302 (e.g., the sensor 302 may provide the functionality of the remote controller 304).

The sensor 302 may be configured to provide output signals (e.g., indications of a strength of a magnetic field as a measured by the sensor 302) to the remote controller 304. The sensor 302 may provide the output signals periodically and/or may provide an output signal responsive to a detected change in a strength of a magnetic field. For example, the sensor 302 may be positioned on a door and may monitor a strength of a magnetic field from an associated magnet positioned on a door frame. The sensor 302 may measure the strength of the magnetic field. Output signals indicating the strength of the measured magnetic field may be periodically reported to the remote controller 304 and/or may be provided to the remote controller 304 based on a detected change to a strength of the magnetic field (e.g., if the door is closed after being open or if the door is open after being closed).

The remote controller 304 receives the output signals from the sensor 302. The remote controller 304 may compare a received output signal to one or more thresholds to determine whether the door is open or closed. For example, the remote controller 304 may compare a received output signal to a first threshold. If the output signal indicates that a detected magnetic field strength satisfies the first threshold (e.g., is greater than, or greater than or equal to, a magnetic field strength associated with the first threshold), the remote controller 304 may determine the door is closed. If the output signal indicates that a detected magnetic field strength does not satisfy the first threshold (e.g., is less than, or less than or equal to, a magnetic field strength associated with the first threshold), the remote controller 304 may determine the door is open. The status of the door as open or closed may be a security event. In this manner, the sensor 302 and the remote controller 304 may operate to monitor security events to determine a state of any object or item (e.g., to determine if a door, window, or other item is in a closed state, an open state, and/or an intermediate partially open state).

Also or alternatively, the remote controller 304 may compare a received output signal to a first threshold and to a second threshold. The first threshold may have a value or magnitude that is greater than the second threshold. If the output signal indicates that a detected magnetic field strength satisfies the first threshold (e.g., is greater than, or greater than or equal to, a magnetic field strength associated with the first threshold), the remote controller 304 may determine the door is closed. If the output signal indicates that a detected magnetic field strength does not satisfy the second threshold (e.g., is less than, or less than or equal to, a magnetic field strength associated with the second threshold, the remote controller 304 may determine the door is open. If the output signal indicates a detected magnetic field strength does not satisfy the first threshold (is less than, or less than or equal to, a magnetic field strength associated with the first threshold) and satisfies the second threshold (e.g., is greater than, or greater than or equal to, a magnetic field strength associated with the second threshold), the remote controller 304 may interpret such an output signal as indicating that the door is in the process of being opened or in the process of being closed and/or is in a partially opened/closed intermediate state (e.g., based on a prior state of the door as determined based on comparison of a prior output signal to the first threshold and the second threshold). The remote controller 304 may determine the door is opened (e.g., partially opened) if the one or more subsequent output signals from the sensor 302 are between the first threshold and the second threshold.

The remote controller 304 may comprise a computing device such as, for example, the computing device 200. The remote controller 304 may be communicatively coupled (e.g., over the network 308) to any number of any type of sensors positioned throughout a premises including, for example, one or more Internet of Things (IoT) devices.

The user device 306 may be any type of user device including, for example, a mobile device, a smartphone, a tablet, a laptop computer, a desktop computer, or an equivalent thereof. The user device 304 may comprise a computing device such as, for example, the computing device 200. The user device 306 may be communicatively coupled (e.g., over the network 308) to the sensor 302 and/or the remote controller 304. The remote controller 304 may provide information to the user device 306 based on operation of the sensor 302. For example, the remote controller 304 may provide information to the user device 306 indicating the status of a door to which the sensor 302 is coupled or attached—for example, whether the door is open or is closed. In this manner, security events associated with an object to which the sensor 302 is attached may be reported to a user or operator of the system 300, thereby allowing the user to monitor the security of a premises.

The user device 306 may comprise a user interface (e.g., via an application or app) to control or manage operation of the sensor 302 and/or the remote controller 304. The user interface may provide a visual and/or audible indication of a status of the operation of the sensor 302 and/or the status of an object (e.g., a door) to which the sensor 302 is attached. For example, if a door to which the sensor 302 is attached is opened, the user interface may provide an indication that the door is open—based on operation of the sensor 302 and/or the remote controller 304. The user interface provided by the user device 306 may indicate a variety of information related to a security event such as for example, if a door was opened, how long the door remained open, and/or if the door was closed.

A user of the user device 306 may specify preferences for monitoring security events using the user interface. For example, the user interface may allow a user to receive an alert anytime the door is opened. Alternatively or additionally, the user interface may allow the user to receive an alert only if the door has been opened for an amount of time that exceeds a threshold amount of time. The threshold amount of time may be set to any value or amount of time. The threshold amount of time may be set or adjusted by the user via the user interface of the user device 308.

The network 308 may be any type of communications and/or computer network. The network 308 may comprise any type of communication mediums and/or may be based on any type of communication standards or protocols. The network 308 may communicatively couple the sensor 302, the remote controller 304, and the user device 306, to enable data or other information to be shared across any of the devices depicted in FIG. 3. The network 308 may operate according to any number of communication specifications or protocols such as, for example, Zigbee, WiFi, or Ethernet.

The remote controller 304 and/or the sensor 302 may store one or more thresholds for determining whether a door is open or closed. The thresholds may be adjusted by the remote controller 304, the sensor 302, and/or the user device 306. The thresholds may be adjusted automatically by the remote controller 304, the sensor 302, and/or the user device 306 or the thresholds may be adjusted responsive to a user input, command, or instruction (e.g., issued via the user interface of the user device 306). The thresholds may also be stored and/or adjusted by the security monitor server 140 and/or the security monitor database 141.

A first threshold for determining whether the door is open or closed may be set to any value. The first threshold for determining whether the door is open or closed may be set based on test measurements during installation of the sensor 302. For example, during installation of the sensor 302, the sensor 302 may be securely attached to a door and if the door is closed the sensor 302 may detect and measure a first relatively strong magnetic field. The first threshold may be set based on the first relatively strong magnetic field measured by the sensor 302 at the time of installation. As a first example, the first threshold may be set to be a predetermined percentage of (or a predetermined percentage lower than) the first relatively strong magnetic field measured by the sensor 302 (e.g., the first threshold may be set to have a value that is 75% of the value of the first relatively strong magnetic field measured by the sensor 302). As a second example, the first threshold may be set to be a predetermined amount less than the first relatively strong magnetic field measured by the sensor 302 (e.g., the first threshold may be set to have a value that is 10 mT less than the value of the first relatively strong magnetic field measured by the sensor 302). The predetermined percentage and/or the predetermined amount less may be stored by or hard coded into any of the devices that may set or adjust the first threshold. The predetermined percentage and/or the predetermined amount less may be set or adjusted responsive to a user input, command, or instruction (e.g., issued via the user interface of the user device 306).

The first threshold may also be set based on a set of first relatively strong magnetic field measurements made by the sensor 302 at the time of installation. For example, two or more measurements of a relatively strong magnetic field made by the sensor 302 may be averaged to determine an average measured strength value that is then used to set the first threshold. The first threshold may be set to be a predetermined percentage of (or a predetermined percentage lower than) than the average measured strength value. The first threshold may be set to be a predetermined amount less than the average measured strength value. Alternatively, the first threshold may be set to be a predetermined percentage of (or a predetermined percentage lower than) than the lowest measured strength value of the set of first relatively strong magnetic field measurements made by the sensor 302. The first threshold may be set to be a predetermined amount less than the lowest measured strength value of the set of first relatively strong magnetic field measurements made by the sensor 302.

Over time, as the door is used, the attachment of the sensor 302 to the door (or the magnet to the door frame) may change. For example, an alignment or position of the sensor 302 (e.g., relative to an associated magnet) may change over time, such that if the door is closed the sensor may detect a slightly weaker magnetic field (e.g., a second relatively strong magnetic field). The second relatively strong magnetic field detected by the sensor 302 may satisfy the first threshold (e.g., be greater than the first threshold), but may be less than the first relatively strong magnetic field. The remote controller 304 may monitor changes in magnetic field strengths measured by the sensor 302 when the door is closed. Based on the changes to the magnetic field measurements over time, the remote controller 304 may adjust the first threshold. For example, the remote controller 304 may determine to lower the first threshold to reduce a likelihood that a measured magnetic field strength when the door is closed is erroneously interpreted as indicating that the door is open. The remote controller 304 may report a change to the first threshold to the user device 306. Changes to any threshold may be made in this manner may be implemented automatically or may require user confirmation via the user device 306. Alternatively or additionally, the changes over time to the strength of the magnetic field measured by the sensor 302 when the door is closed may be reported to the user device 308, and the user device 308 may be configured to allow a user to adjust the first threshold.

The remote controller 304 may determine a reduction in a strength of the magnetic field and/or may determine a downward trend in a strength of the magnetic field (e.g., over a period of time) based on measurements made by the sensor 302 and reported to the remote controller 304. The remote controller 304 may determine reductions or trends in the strength of the magnetic field based on determining that one or more measured strengths of the magnetic field are within a first predetermined range (or amount) of the first threshold. For example, a set of measurements made by the sensor 302 may each be within the first predetermined range of the first threshold. Alternatively and/or additionally, the remote controller 304 may determine reductions or trends in the strength of the magnetic field based on determining that one or more measured strengths of the magnetic field are less than one or more initial relatively strong magnetic field measurements made by the sensor 302 by at least a second predetermined amount. For example, the remote controller 304 may determine the reduction in the strength of the magnetic field based on a lowest measured strength of the magnetic field being less than a first relatively strong magnetic field measurements made by the sensor 302, by the second predetermined amount. The first predetermined range and the second predetermined amount may be set to any value and may be configurable by any device described herein or may be set or adjust by a user.

Similarly, an alignment or position of the sensor 302 (e.g., relative to an associated magnet) may change over time, such that if the door is closed the sensor may detect a slightly stronger magnetic field (e.g., a second relatively strong magnetic field). The second relatively strong magnetic field detected by the sensor 302 may satisfy the first threshold (e.g., be greater than the first threshold), and may be greater than the first relatively strong magnetic field. The remote controller 304 may monitor changes in magnetic field strengths measured by the sensor 302 when the door is closed. Based on the changes to the magnetic field measurements over time, the remote controller 304 may adjust the first threshold. For example, the remote controller 304 may determine to increase the first threshold to reduce a likelihood that a measured magnetic field strength when the door is open is erroneously interpreted as indicating that the door is closed. The remote controller 304 may report a change to the first threshold to the user device 306. Changes to any threshold may be made in this manner may be implemented automatically or may require user confirmation via the user device 306. Alternatively or additionally, the changes over time to the strength of the magnetic field measured by the sensor 302 when the door is closed may be reported to the user device 308, and the user device 308 may be configured to allow a user to adjust the first threshold.

The remote controller 304 may determine an increase in a strength of the magnetic field and/or may determine an upward trend in a strength of the magnetic field (e.g., over a period of time) based on measurements made by the sensor 302 and reported to the remote controller 304. The remote controller 304 may determine increases or trends in the strength of the magnetic field based on determining that one or more measured strengths of the magnetic field are within a first predetermined range (or amount) of the first threshold. For example, a set of measurements made by the sensor 302 may each be within the first predetermined range of the first threshold. Alternatively and/or additionally, the remote controller 304 may determine increases or trends in the strength of the magnetic field based on determining that one or more measured strengths of the magnetic field are greater than one or more initial relatively strong magnetic field measurements made by the sensor 302 by at least a second predetermined amount. For example, the remote controller 304 may determine the increase in the strength of the magnetic field based on a lowest measured strength of the magnetic field being greater than a first relatively strong magnetic field measurements made by the sensor 302, by the second predetermined amount. The first predetermined range and the second predetermined amount may be set to any value and may be configurable by any device described herein or may be set or adjust by a user.

Figure 4A:
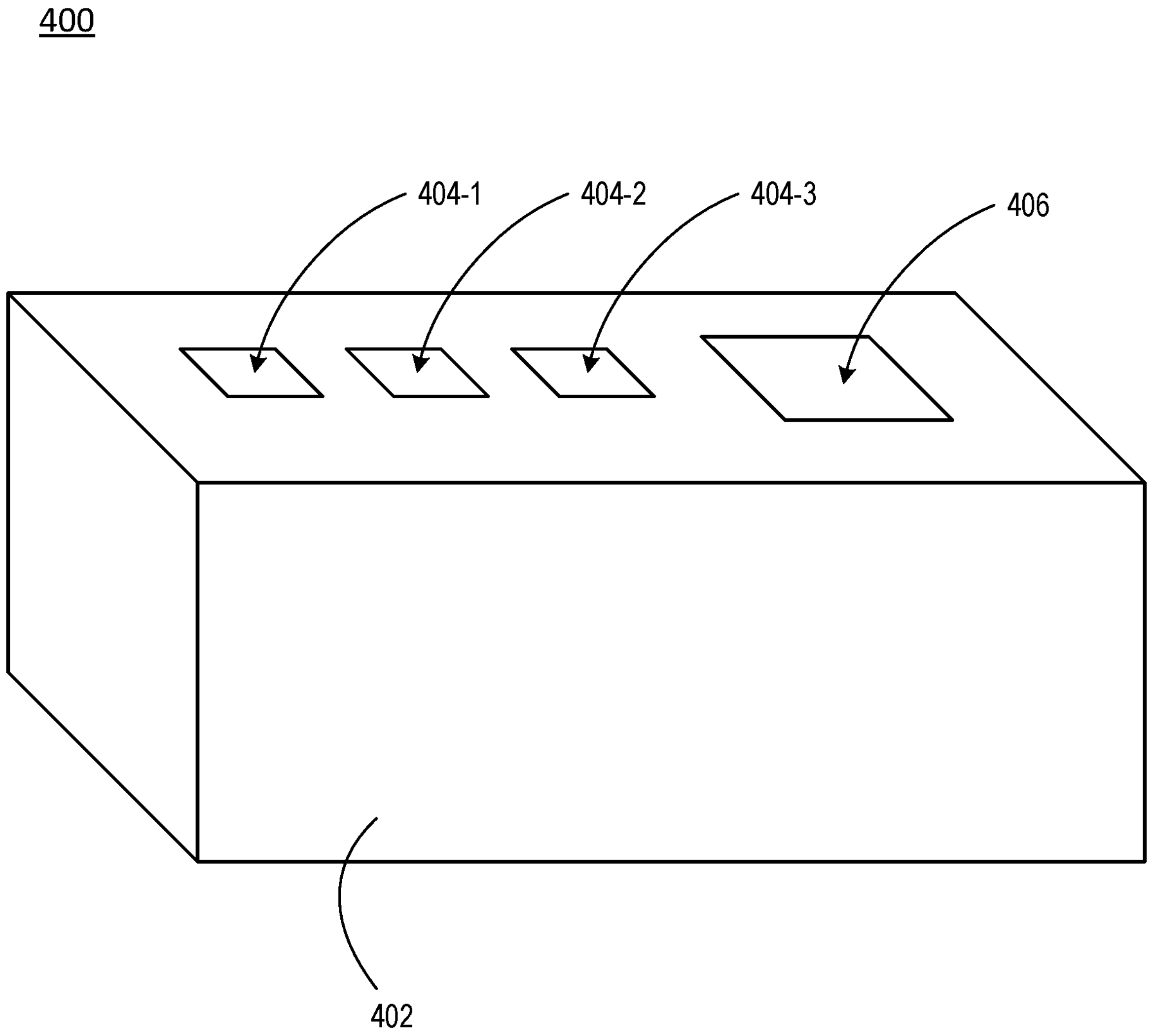
FIG. 4A shows an example sensor.

FIG. 4A shows an example sensor 400. The sensor 400 may be an implementation of the sensor 302. The sensor may be a Hall effect sensor, or other magnetic field detection sensor or position detection sensor. The sensor 400 may be configured to be attached or coupled to an object and may be configured to detect a movement or a closed or open state of the object.

As shown in FIG. 4A, the sensor 400 may comprise a cover or body 402, light emitting diodes (LEDs) 404, and a button 406. The sensor 400 is shown with three LEDs 404: a first LED 404-1, a second LED 404-2, and a third LED 404-3, but is not so limited as the sensor 400 may comprise any number of LEDs 404. The LEDs 404 may be of the same or different colors. For example, the first LED 404-1 may be of a first color (e.g., a green LED), the second LED 404-2 may be of a second color (e.g., an amber LED), and the third LED 404-3 may be of a third color (e.g., a red LED).

The LEDs 404 may provide a variety of functions during installation or during operation after installation of the sensor 400. For example, during installation, the sensor 400 may be installed on a door by an installer. In a first mode of operation (e.g., in a default mode of operation when the sensor 400 is initially turned on), the LEDs 404 may illuminate (e.g., activate) to indicate a strength of a signal received from a controller (e.g., the remote controller 304). The sensor 400 and a corresponding controller may be wirelessly coupled and/or paired during installation. The controller may send a signal (e.g., a wireless signal) to the sensor 400. The sensor 400 may measure a power of the received signal. Based on the measured power or strength of the received signal, the sensor 400 may illuminate one or more LEDs 404 to indicate the measured power or strength of the received signal.

Also or alternatively, the sensor 400 may measure a power of a received wireless signal from a remote controller and may compare the measured power to a first measured signal power threshold and a second measured power threshold. The first measured power threshold may be greater than the second measured power threshold. The first measured power threshold and the second measured power threshold may be expressed in any unit of measure including, for example, Watts (W), milliwatts (mW), or decibel-milliwatts (dBm).

If the measured power of the received signal does not satisfy the second measured power threshold (e.g., is less than, or less than or equal to, a signal power associated with the second measured power threshold), the sensor 400 may illuminate the third LED 404-3. Illumination of the third LED 404-3 may indicate that a relatively weak signal was received from the remote controller. This may indicate a need (e.g., which may inform the installer) to adjust a position or location of the sensor 400 (and/or of the remote controller) to improve the strength of signals the sensor 400 may receive from the remote controller.

If the measured power of the received signal satisfies the first measured power threshold (e.g., is greater than, or greater than or equal to, a signal power associated with the first measured power threshold), the sensor 400 may illuminate the first LED 404-1. Illumination of the first LED 404-1 may indicate that a relatively strong signal was received from the remote controller. This may indicate (e.g., which may inform the installer) that the sensor 400 is in a position or location capable of receiving strong signals from the remote controller such that the position of the sensor 400 may not need to be moved to communicate with the remote controller.

If the measured power of the received signal satisfies the second measured power threshold (e.g., is greater than, or greater than or equal to, a signal power associated with the second measured power threshold) and does not satisfy the first measured power threshold (e.g., is less than, or less than or equal to, a signal power associated with the first measured power threshold), the sensor 400 may illuminate the second LED 404-2. Illumination of the second LED 404-2 may indicate that a signal of intermediate signal strength (e.g., relative to a relatively weak signal strength and a relative strong signal strength) was received from the remote controller. This may indicate (e.g., which may inform the installer) that the sensor 400 is capable of communicating with the remote controller but that further adjustment to the position of the sensor 400 may improve the strength of the signals the sensor may receive from the remote controller.

In a second mode of operation (e.g., in a mode of operation after the first mode of operation described above), the LEDs 404 may illuminate to indicate a strength of a measured magnetic field. The sensor 400 may be positioned during installation in relatively close proximity to a corresponding magnet. For example, the sensor 400 may be installed onto a door. A corresponding magnet may be installed in relatively close proximity to the sensor 400 (e.g., if the door is closed) on a door frame. During the second mode of operation of the sensor 400, the sensor 400 may measure a strength of a detected magnetic field based on the corresponding magnet. Based on the measured power or strength of the magnetic field, the sensor 400 may illuminate one or more LEDs 404 to indicate the measured strength of the magnetic field.

An installer may cause the sensor 400 to switch (e.g., transition) to the second mode of operation in a variety of manners. As a first example, the cover 402 may be closed (e.g., relative to a base of the sensor 400) from an open position to cause the sensor 400 to enter the second mode of operation. As a second example, the installer may engage (e.g., press) the button 406 (e.g., toggle button) to cause the sensor 400 to enter the second mode of operation.

Once the sensor 400 operates within the second mode of operation, the sensor 400 may illuminate the LEDs 400 based on a strength of the measured magnetic field. For example, the installer may close the door such that the sensor 400 is in relatively close proximity to a corresponding magnet positioned on a door frame. The sensor 400 may measure a strength of the magnetic field and may compare the measured strength to a first measured magnetic field strength threshold and a second measured magnetic field strength threshold. The first measured magnetic field strength threshold may be greater than the second measured magnetic field strength threshold. The first measured magnetic field strength threshold and the second measured magnetic field strength threshold may be expressed in any unit of measure including, for example, Tesla (T) or milliTesla (mT).

If the measured strength of the magnetic field does not satisfy the second measured magnetic field strength threshold (e.g., is less than, or less than or equal to, a magnetic field strength associated with the second measured magnetic field strength threshold), the sensor 400 may illuminate the third LED 404-3. Illumination of the third LED 404-3 may indicate that a relatively weak magnetic field strength was measured by the sensor 400. This may inform the installer to adjust a position or location of the sensor 400 and/or the magnet to improve the strength of magnetic field the sensor 400 may measure when the door is closed.

If the measured strength of the magnetic field satisfies the first measured magnetic field strength threshold (e.g., is greater than, or greater than or equal to, a magnetic field strength associated with the first measured magnetic field strength threshold), the sensor 400 may illuminate the first LED 404-1. Illumination of the first LED 404-1 may indicate that a relatively strong magnetic field strength was measured by the sensor 400. This may inform the installer that the position of the sensor 400 and the magnet are suitable for correctly detecting if the door is closed.

If the measured strength of the magnetic field satisfies the second measured magnetic field strength threshold (e.g., is greater than, or greater than or equal to a magnetic field strength associated with the second measured magnetic field strength threshold) and does not satisfy the first measured magnetic field strength threshold (e.g., is less than, or less than or equal to a magnetic field strength associated with the first measured magnetic field strength threshold), the sensor 400 may illuminate the second LED 404-2. Illumination of the second LED 404-2 may indicate an intermediate strength of the magnetic field was measured (e.g., relative to a relatively weak measured magnetic field and a relative strong measured magnetic field strength). This may inform the installer that further adjustments to a position or location of the sensor 400 and/or the magnet may be useful to improve the strength of magnetic field the sensor 400 may measure if the door is closed.

The sensor 400 may operate to compare the measured strength of the magnetic field to any number of thresholds. Further, the sensor 400 may alternatively use a separate set of LEDs (e.g., one or more LEDs) to indicate a strength of a measured magnetic field.

In a third mode of operation, the sensor 400 may measure a strength of a magnetic field (e.g., based on the relative positions of the sensor 400 and a corresponding magnet) and may report the measured strengths of the magnetic field to an associated remote controller (e.g., the remote controller 304). The sensor 400 may measure and report the strength of the magnetic field according to any desired interval or frequency. For example, the sensor 400 may measure and report the strength of the magnetic field periodically according to a period of time set by a user (e.g., a user of the user device 306).

An installer may cause the sensor 400 to switch to the third mode of operation in a variety of manners. As a first example, the cover 402 may be closed (e.g., relative to a base of the sensor 400) from an open position to cause the sensor 400 to enter the third mode of operation. As a second example, the installer may engage (e.g., press) the button 406 to cause the sensor to enter the third mode of operation. An installer may cause the sensor 400 to enter the third mode of operation after determining that the sensor 400 is receiving a relatively strong signal from the remote controller (e.g., as determined during the first mode of operation) and/or after determining that the sensor 400 is measuring a relatively strong magnetic field if the door is closed (e.g., as determined during the second mode of operation). The third mode of operation for the sensor 400 may be a steady-state mode of operation for the sensor.

During the third mode of operation, the sensor 400 may generate and transmit a reporting signal or message to the remote controller after each measurement of the strength of the magnetic field. The reporting signal may indicate a strength of the measured magnetic field. The reporting signal may comprise other indications as well including, for example, an indication of a received signal strength from the remote controller (e.g., an average received signal strength or a signal strength of a most recently received signal from the remote controller). The reporting signal may also comprise other indications such as temperature measurements.

The remote controller may compare the indications of measured magnetic field strength from the sensor 400 to one or more thresholds. For example, the remote controller may compare the indications of measured magnetic field strength from the sensor 400 to a measured magnetic field strength threshold. If an indication of a measured magnetic field strength from the sensor satisfies the measured magnetic field strength threshold (e.g., is greater than, or greater than or equal to, a magnetic field strength associated with the measured magnetic field strength threshold), the remote controller may determine that the door is closed. If an indication of a measured magnetic field strength from the sensor does not satisfy the measured magnetic field strength threshold (e.g., is less than, or less than or equal to, a magnetic field strength associated with the measured magnetic field strength threshold), the remote controller may determine that the door is open.

The measured magnetic field strength threshold (alarm threshold) may be stored by the remote controller. The measured magnetic field strength threshold may be set or determined based on measurements made by the sensor 400 during the second mode of operation. For example, during the second mode of operation, the sensor 400 may report one or more measurements of the strength of the magnetic field detected by the sensor 400 when the door is closed. The remote controller may use the one or more measurements to set the measured magnetic field strength threshold. The measured magnetic field strength threshold may be set to be lower than the one or more measurements. For example, the measured magnetic field strength threshold may be set to be a certain percentage lower than the one or more measurements (e.g., 30% lower). As another example, the measured magnetic field strength threshold may be set to be a certain level lower than the one or more measurements (e.g., 5 mT lower than an average of the one or more measurements).

As a further example, the sensor 400 during the second mode of operation may provide one or more first measurements indicating a strength of the magnetic field when the door is closed and may provide one or more second measurements indicating a strength of the magnetic field when the door is open. The remote controller may use the one or more first measurements and/or the one or more second measurements to set one or more measured magnetic field strength thresholds.

A measured magnetic field strength threshold may be initially set or determined during installation of the sensor 400. Over time, during the third mode of operation, a position of the sensor 400 and/or its corresponding magnet may change. For example, as the door is repeatedly used, an initial positioning of the sensor 400 on the door may be altered, thereby adjusting an orientation and/or alignment of the sensor 400 relative to the corresponding magnet positioned on the door frame. This may affect measurements of the strength of the magnetic field by the sensor 400 when the door is closed or when the door is open. For example, due to a change in alignment between the sensor 400 and the corresponding magnetic, the sensor 400 may measure a relatively lower strength of the magnetic field if the door is closed after extended use as compared to a relatively higher strength of the magnetic field if the door is closed when the sensor is first installed.

With respect to a particular example, the sensor 400 at the time of installation may measure the strength of the magnetic field when the door is closed to be 18 mT. The remote controller may set the measured magnetic field strength threshold to be 10 mT based on this measurement. At a later time (e.g., months after installing the sensor 400), the sensor 400 may measure the strength of the magnetic field when the door is closed to be 14 mT. In response to the sensor 400 measuring a lower strength of the magnetic field when the door is closed relative to the strength of the magnetic field measured at the time of installation, the remote controller may adjust the measured magnetic field strength threshold. For example, the remote controller may reduce or decrease the measured magnetic field strength threshold to 9 mT. In doing so, the remote controller may avoid false alarm reporting—for example, the remote controller may avoid or may reduce a likelihood of incorrectly determining that the door is open if in fact the door is closed, based on the changed orientation of the sensor 400 and the magnet.

The remote controller may use any number of thresholds to determine if the door is open, closed, or in partially closed or partially open state. Any of these thresholds may be adjusted by the remote controller based on any measurements of the magnetic field strength by the sensor 400. The remote controller may adjust any threshold based on any measurements of the magnetic field strength received from the sensor 400 over any period of time. For example, the measured magnetic field strength threshold may be adjusted to be lower if the reported measurements from the sensor 400 are lower than an initial reported measurement (e.g., during installation) for a certain period of time. The reported measurements may be lower based on a direct comparison of measured values or based on a percentage change of the reported measurements compared to the initial measurement.

The initial measurement may be an average of two or more measurements made by the sensor determined at the time of installation. Alternatively, the initial measurement may be a single measurement made at the time of installation. An installer may designate a measurement (or set of measurements, or average of a set of measurements) made by the sensor 400 at the time of installation to be the initial measurement. The initial measurement may be a maximum reported measured value from the sensor. The initial measurement may be designated for comparison purposes at a later time for adjusting any threshold such as, for example, the measured magnetic field strength threshold.

Any measurement made during the third mode of operation may be used to compare to the initial measurement. During the third mode of operation, any set or sequence of measurements, or any averaging of any number of measurements, may be used to compare to the initial measurement to determine if any threshold should be increased or decreased. For example, the remote controller may adjust the measured magnetic field strength threshold based on a certain number of current measurements being lower or being higher than the initial measurement by a certain amount (e.g., by a specified magnetic field strength change or difference). The certain number of current measurements may be predetermined, may be a number of measurements threshold, and/or may be set by the installer and/or the user of the user device 306. The certain amount of change in the measurements may be predetermined, may be a measurement change threshold, and/or may be set by the installer and/or the user of the user device 306. The measurement change threshold may be a certain measurement value change (e.g., expressed as a change in magnitude of the measured magnetic field strength such as 3 mT) or may be expressed as a change in percentage (e.g., relative to the intimal measurement such as 15% lower or higher than the initial measurement). In this manner, if the sensor consistently reports lower measured strength of the magnetic field if the door is closed as compared to when the sensor 400 was initially installed, thresholds used for determining a security event—for example, whether the door is open or closed—may be adjusted to account for changes in the position and orientation of the sensor 400 and the magnet. By dynamically adjusting the thresholds based on changes to the reported measurements over time, the likelihood that the door will be determined to be open based on a relatively low measurement made by the sensor 400 if the door is actually closed will be reduced. Similarly, if the sensor consistently reports increased measured strength of the magnetic field if the door is closed as compared to when the sensor 400 was initially installed, thresholds used for determining a security event—for example, whether the door is open or closed—may be adjusted (e.g., increased) to account for changes in the position and orientation of the sensor 400 and the magnet. By dynamically adjusting the thresholds based on changes to the reported measurements over time, the likelihood that the door will be determined to be closed based on a relatively high measurement made by the sensor 400 if the door is actually open will be reduced.

For example, the measured magnetic field strength threshold may be initially set based on initial measurements of the magnetic field made by the sensor 400 when the door is closed. At a later time, measurements of the magnetic field made by the sensor 400 when the door is closed may be consistently lower than the initial measurements. The sensor 400 (or the remote controller) may lower the measured magnetic field strength threshold based on the later measurements indicating a lower magnetic field strength than the initial measurements. The threshold may be lowered based on the later measurements still satisfying the original threshold (e.g., meeting or exceeding the original threshold) by a predetermined amount or by a predetermined threshold.

Further, sensor 400 may be commanded via an instruction from the remote controller to operate in a lower power mode. The remote controller may determine that measurements of the magnetic field strength when the door is closed consistently satisfy an initial measured magnetic field strength threshold (e.g., are greater than, or greater than or equal to a magnetic field strength associated with an initial measured magnetic field strength threshold) by a predetermined amount or predetermined threshold. As such, the remote controller may determine that the sensor 400 and magnet are well positioned and oriented to provide reliable measurements of the magnetic field if the door is closed. In turn, the remote controller may send the sensor 400 a command to enter into a lower power mode or low power operating mode to conserve battery resources. In the low power mode, one or more bias currents of the sensor 400 may be lowered to reduce power consumption. The one or more bias currents of the sensor 400 may be lowered without affecting the accuracy of the magnetic field measurements made by the sensor 400.

The sensor 400 may be integrated with the remote controller to form a combined sensor-controller device (e.g., the sensor may be part of the controller). The sensor 400 may also store any magnetic field strength measurement thresholds and may compare any measured magnetic field strength value to the one or more stored thresholds.

Figure 4B:
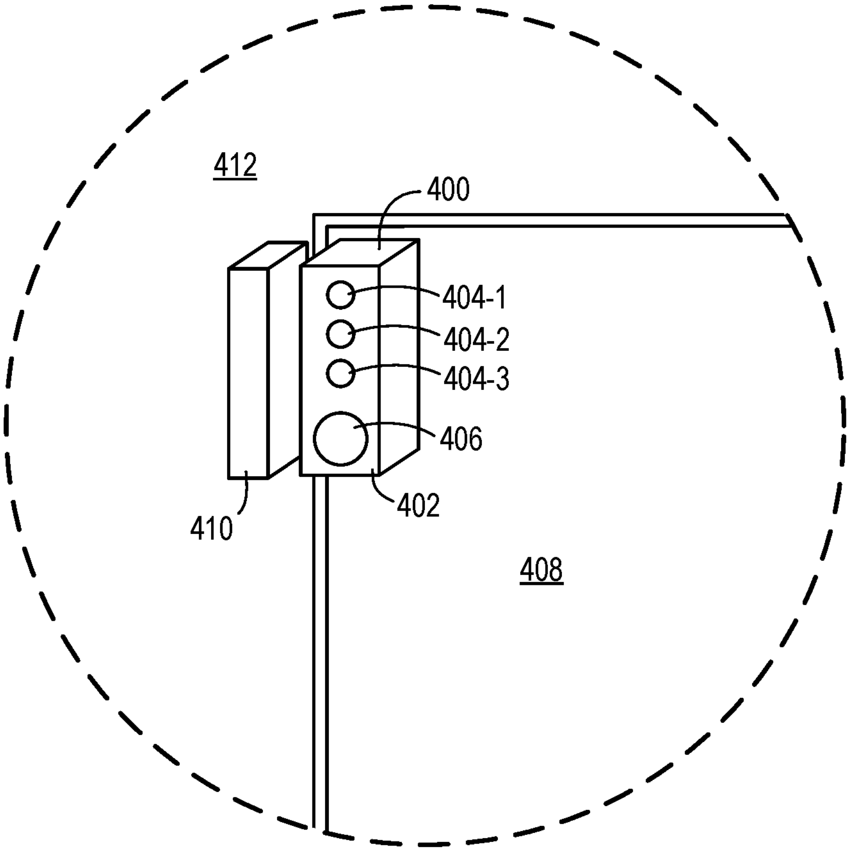
FIG. 4B shows an example installation of the sensor of FIG. 4A.

FIG. 4B shows an example installation of the sensor 400. As shown in FIG. 4B, the sensor 400 may be attached (e.g., connected or coupled) to a door 408. A magnet 410 may be attached (e.g., connected or coupled) to a door frame 412. The sensor 400 may be attached in relatively close proximity to an edge or corner of the door 408. The magnet 410 may be attached to the door frame 412 in relatively close proximity to an edge or corner of the door 408. FIG. 4B shows the door 408 in a closed positioned such that the sensor 400 is in relatively close proximity to the magnet 410. As such, the sensor 400 may detect a relatively strong magnetic field from the magnet 410. Alternatively, the sensor 400 may be attached to the door frame 412 and the magnet 410 may be attached to the door 408.

Figure 5A:
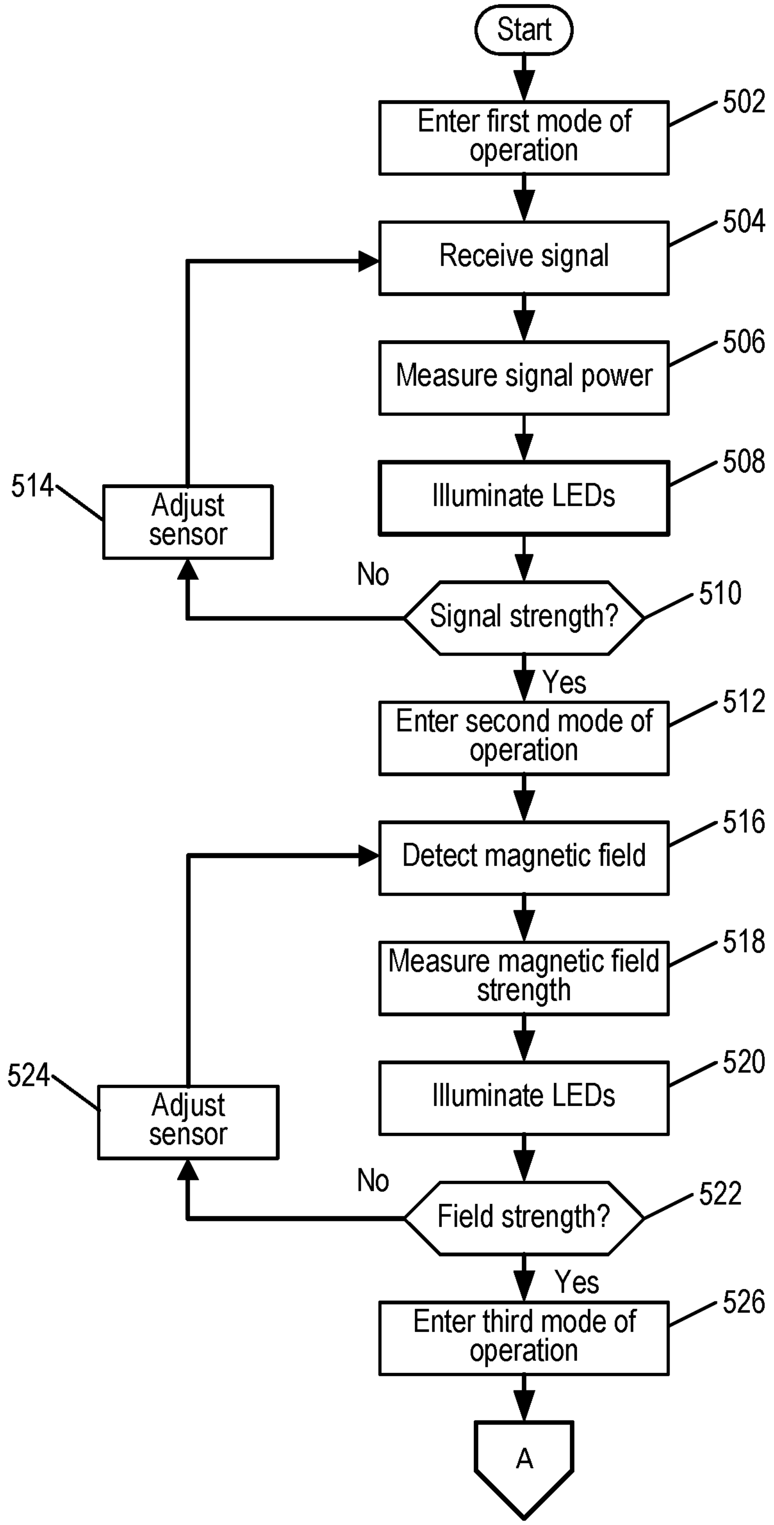
FIGS. 5A and 5B are a flow chart showing steps of an example method associated with security monitoring.
Figure 5B:
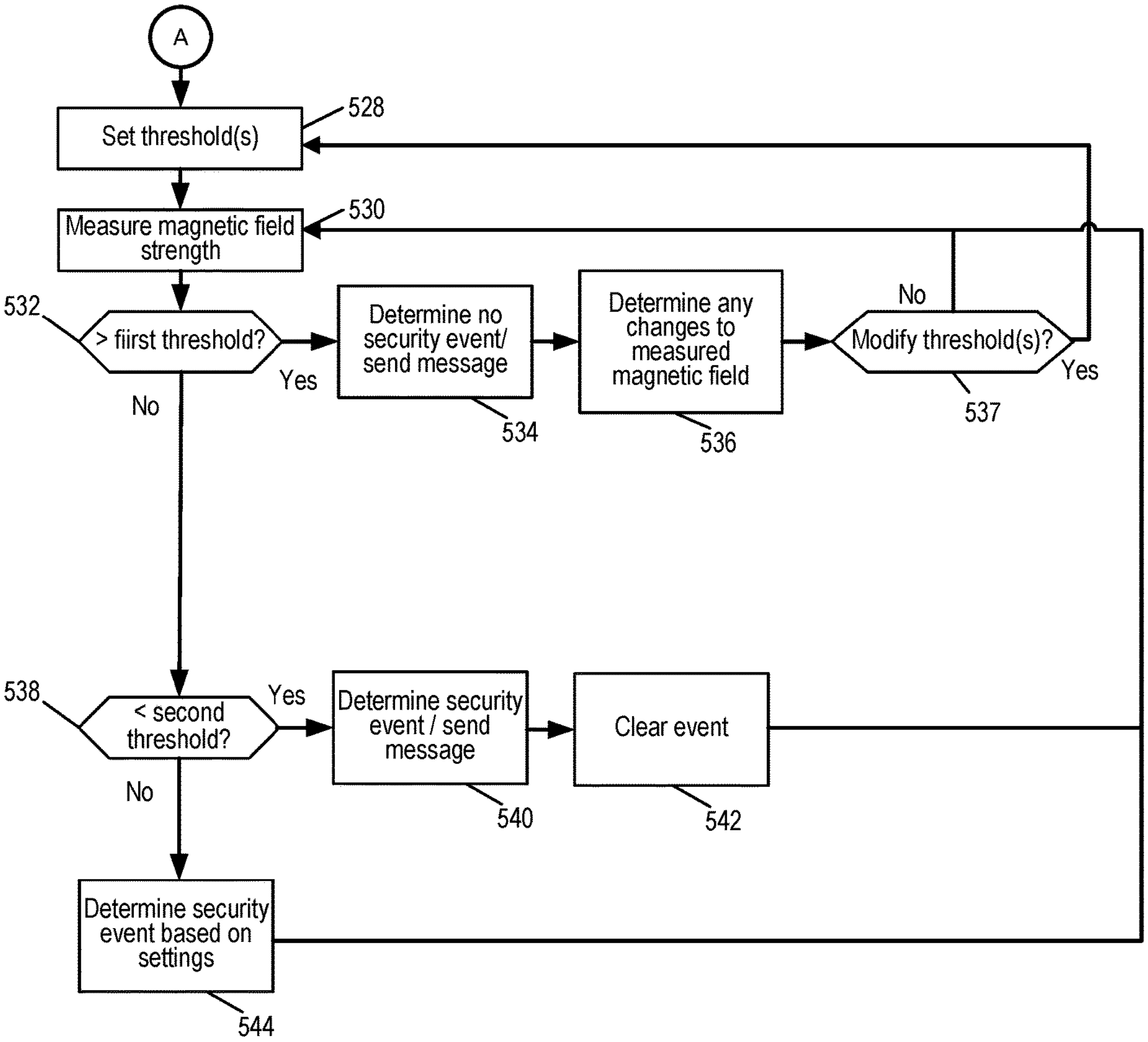

FIGS. 5A and 5B are a flow chart showing steps of an example method associated with monitoring security events. One, some, or all steps of the example method of FIGS. 5A and 5B may be performed by any of the devices described herein (e.g., the sensor 302, the sensor 400, the remote controller 304, the security monitor server 140, the user device 306, and/or an integrated sensor 302 or sensor 400 and remote controller 304). Also or alternatively, one, some, or all steps of the example method of FIGS. 5A and 5B may be performed by one or more other devices, including any of the computing devices described herein. Steps of the example method of FIGS. 5A and 5B may be omitted, performed in other orders, and/or otherwise modified, and/or one or more additional steps may be added.

The method may start in step 502. In step 502, a sensor may enter a first mode of operation. The sensor may be the sensor 302. The sensor may enter the first mode of operation by default. For example, the sensor may be powered up or turned on in step 502 and may be configured to automatically enter the first mode of operation. In the first mode of operation, the sensor may be configured to receive a signal from a remote controller (e.g., the remote controller 304), measure a power of the received signal, and to send a signal or message to the remote controller indicating a power of the received signal, as described further herein.

The sensor may enter the first mode of operation as a first phase of installing the sensor. For example, in step 502, an installer may begin an installation process of the sensor. The installation process may involve positioning the sensor on an object that is to be monitored (e.g., a door) and ensuring the sensor can receive a signal from an associated remote controller.

In step 504, the sensor may receive a signal from the remote controller. The signal may be any type of signal including, for example, a wired signal or a wireless signal. The signal may be transmitted and received over any communication network (e.g., the network 308) and/or medium based any communication standard or protocol. The signal may be a signal generated and transmitted according to the Zigbee protocol (e.g., the signal may be a wireless Zigbee signal).

In step 506, the sensor may measure a power of the received signal (e.g., determine a signal strength of the received signal). A technique or procedure implemented by the sensor to measure the power of the received signal may be known to the remote controller.

In step 508, the sensor may illuminate one or more LEDs (e.g., the LEDs 404-1 through 404-3) based on the measured power of the received signal. The sensor may compare the measured power of the received signal to one or more thresholds (e.g., signal power measurement thresholds) to determine one or more LEDs to illuminate to indicate the measured power of the received signal. Illumination of the LEDs may visually indicate to an individual (e.g., an installer) if the sensor is receiving a signal of adequate signal power from the remote controller. The LEDs may illuminate in a manner to indicate whether the sensor should be repositioned to attempt to receive a stronger signal from the remote controller or if the signal received from the remote controller is of adequate strength. The assessment as to whether the sensor is receiving a signal from the remote controller of an adequate strength may be made based a visual determination of which LEDs are illuminated.

The remote controller may send a test signal to the sensor during the first mode of operation of the sensor. The test signal may be transmitted periodically and/or continuously to provide a signal for the sensor to receive and to measure the power of the signal. The LEDs of the sensor may illuminate based on a most recently received and measured signal from the remote controller and may change illumination based on a next received and measured signal from the remote controller. The test signal from the remote controller may be transmitted once every minute for example.

In step 510, the sufficiency of the strength of the received signal may be determined. The sensor may illuminate the first LED 404-1 if the signal being received by the sensor is of adequate strength. The sensor may send a message to the remote controller reporting the measured signal strength of a received signal from the remote controller. The remote controller may determine based on the received measured signal strength if the sensor is receiving signals at an adequate level of strength. The method may proceed to step 512 if the signal being received by the sensor is of adequate strength. Alternatively, the method may proceed to step 514 if the signal being received by the sensor is not of adequate strength. For example, the method may proceed to step 514 if the third LED 404-3 is illuminated.

In step 514, the sensor may be repositioned to improve a strength of the signal it may receive from the remote controller. For example, a change to a position or an alignment of the sensor on a door may be made so as to improve a wireless reception of a signal from the remote controller. Steps 504 through 510 may be repeated to determine if the signal from the remote controller is now (e.g., after repositioning) being received at an adequate power level by the repositioned sensor (e.g., based on one or more determinations made by the remote controller). In step 514, the installer may engage an interface of the sensor (e.g., the button 406) to reset the illumination of the LEDs and to cause the sensor to re-measure a signal from the remote controller. The sensor may also generate and transmit a signal or message to the remote controller reporting the measured strength of the received signal.

As mentioned above, in step 512, the sensor may enter a second mode of operation. The sensor may enter the second mode of operation in a variety of manners. The installer may cause the sensor to enter the second mode of operation. For example, the installer may engage a feature of the sensor (e.g., the button 406) to cause the sensor to transition from the first mode of operation to the second mode of operation.

In the second mode of operation, the sensor may be configured to measure a strength of a magnetic field. The magnetic field may be provided by a magnetic associated with the sensor. For example, a magnet positioned on an object (e.g., a door frame) near the object to which the sensor is attached (e.g., a door) may provide a magnetic field. The sensor may be configured to detect the magnetic field and to measure a strength of the magnetic field.

The sensor may enter the second mode of operation as a second phase of installing the sensor. For example, in step 512, an installer may continue an installation process of the sensor. The second phase of the installation process may involve positioning the sensor on an object that is to be monitored (e.g., a door) and ensuring the sensor can detect and measure a strength of a magnetic field provided by a corresponding magnet.

The sensor may enter the second mode of operation automatically or manually. The sensor may be configured to automatically enter the second mode of operation based on a command received from the remote controller. The sensor may be configured to manually enter the second mode of operation based on the installer engaging a feature of the sensor. For example, the installer may engage a user interface feature (e.g., the button 406) to cause the sensor to enter the second mode of operation.

In step 516, the sensor may detect a magnetic field. The magnetic field may be provided by a magnet associated with the sensor (e.g., a paired magnet). The magnet may be positioned on a door frame or a window frame. The magnet may generate a magnetic field that the sensor may detect if the sensor is in relatively close proximity to the magnet. For example, in step 516, the sensor may be attached to a door that is closed. The magnet that may be positioned on the door frame in relatively close proximity to the sensor. The sensor may therefore be in relatively close proximity to the magnet and may detect a magnetic field from the magnet.

In step 518, the sensor may measure an intensity or strength of the magnetic field from the magnet (e.g., a flux density of the magnetic field). The sensor may comprise a magnetometer to measure the strength of the magnetic field. A technique or procedure implemented by the sensor to measure the strength of the magnetic field may be known to the remote controller. The measurement of the strength of the magnetic field may be a measurement of the strength of the magnetic field if the sensor is in close proximity to the magnet—for example, if the door is closed such that the measurement indicates a strength when the door is closed.

In step 520, the sensor may illuminate one or more LEDs (e.g., the LEDs 404-1 through 404-3) based on the measured strength of the detected magnetic field. The sensor may compare the measured strength of the magnetic field to one or more thresholds (e.g., magnetic strength measurement thresholds) to determine one or more LEDs to illuminate to indicate the measured strength of the magnetic field. Illumination of the LEDs may visually indicate to an individual (e.g., an installer) if the sensor is detecting a magnetic field of adequate strength from the magnet. The LEDs may illuminate in a manner to indicate whether the sensor should be repositioned to attempt to receive a stronger magnetic field from the magnet or if the magnetic field detected from the magnet is of adequate strength. The assessment as to whether the sensor is receiving a signal from the remote controller of an adequate strength may be made based a visual determination of which LEDs are illuminated.

In step 522, the sufficiency of the strength of the magnetic field may be determined. The sensor may illuminate the first LED 404-1 if the magnetic field being detected by the sensor is of adequate strength. The sensor may send a message to the remote controller reporting the measured strength of the magnetic field. The remote controller may determine based on the received measured strength of the magnetic field if the sensor is detecting a magnetic field of sufficient strength. The method may proceed to step 526 if the strength of the magnetic field measured by the sensor is of adequate strength. Alternatively, the method may proceed to step 524 strength of the magnetic field measured by the sensor is not of adequate strength. For example, the method may proceed to step 524 if the third LED 404-3 is illuminated.

In one example, a first LED (e.g., green LED) of the sensor (the LED 404-1) may illuminate if the measured strength of the magnetic field is 10 mT or greater; a second LED (e.g., amber LED) of the sensor (the LED 404-2) may illuminate if the measured strength of the magnetic field is 7 mT or greater and less than 10 mT; and a third LED (e.g., red LED) of the sensor (the LED 404-3) may illuminate if the measured strength of the magnetic field is less than 7 mT.

In step 524, the sensor and/or the corresponding magnet may be repositioned to improve a strength of the magnetic field detected by the sensor. For example, a change to a position or an alignment of the sensor on a door may be made so as to improve detection of the magnetic field from the magnet. Steps 514 through 520 may be repeated to determine if the magnetic field from the magnet is now (e.g., after repositioning) being detected at an adequate level by the repositioned sensor (e.g., based on one or more determinations made by the remote controller). In step 524, the installer may engage an interface of the sensor (e.g., the button 406) to reset the illumination of the LEDs and to cause the sensor to re-measure a strength of the magnetic field from the magnet. As described herein, the sensor may also generate and transmit a signal or message to the remote controller reporting the measured strength of the magnetic field so that the sufficiency of the strength of the measured magnetic field may be determined by the remote controller.

In step 526, the sensor may enter a third mode of operation. The sensor may enter the third mode of operation in a variety of manners. The installer may cause the sensor to enter the third mode of operation. For example, the installer may engage a feature of the sensor (e.g., the button 406) to cause the sensor to transition from the second mode of operation to the third mode of operation. The sensor may enter the third mode of operation based on a command from the remote controller.

In the third mode of operation, the sensor may be configured to operate in a steady-state or post-installation manner. In the third mode of operation, the sensor may be configured to perform a number of functions or operations including, for example, measure the strength of a signal received from the remote controller, measure the strength of the magnetic field from the magnet, receive and process commends or other signals from the remote controller, provide to the remote controller an indication of the measured received signal strength from the remote controller, and/or provide to the remote controller an indication of the measured magnetic field strength from the magnet. The sensor may also measure and provide indications of other detected or sensed environmental conditions. For example, the sensor may measure and report a sensed temperature during the third mode of operation.

The sensor may enter the third mode of operation after an installation of the sensor is completed. For example, in step 526, it may be determined (e.g., by the remote controller) that the sensor is capable of receiving signals from the remote controller at an adequate power level and/or that the sensor is capable of detecting a magnetic field from the magnet at an adequate strength level if the sensor is in close proximity to the magnet (e.g., when the door is closed).

In step 528, one or more thresholds may be set. The thresholds may be thresholds used for comparison to measured magnetic field strength measurements made by the sensor. The thresholds may be set by the sensor and/or the remote controller. The thresholds may be stored by the sensor and/or the remote controller. The thresholds may be used by the sensor and/or the remote controller to compare to any magnetic field strength measurement made by the sensor to determine if a security event has occurred—for example, to determine if a door to which the sensor is connected is closed or open.

The thresholds may comprise a first magnetic field strength threshold and a second magnetic field strength measurement. The first magnetic field strength threshold and the second magnetic field strength threshold may be represented in milliTeslas, mT. The first magnetic field strength threshold may be greater than the second magnetic field strength threshold. In one example, the first magnetic field strength threshold may be 1.540 mT and the second magnetic field strength threshold may be 0.94 mT.

The sensor and/or remote controller may operate in the following manner based on the first magnetic field strength threshold and the second magnetic field strength threshold. If a measured strength of a detected magnetic field from the magnet satisfies the first magnetic field strength threshold (e.g., is greater than, or greater than or equal to, a magnetic field strength associated with the first magnetic field strength threshold), the sensor and/or remote controller may determine that the sensor is in relatively close proximity to the magnet. As such, the sensor and/or remote controller may determine that the door to which the sensor is closed and/or that no security event (e.g., no alarm condition) is occurring. An indication that the door is closed may be provided by the sensor and/or the remote controller to a user device (e.g., the user device 306) and/or to a remote server (e.g., the security server 140). The indication may be a message that also comprises the measured strength of the magnetic field.

If a measured strength of a detected magnetic field from the magnet does not satisfy the second magnetic field strength threshold (e.g., is less than, or less than or equal to, a magnetic field strength associated with the second magnetic field strength threshold), the sensor and/or remote controller may determine that the sensor is not in relatively close proximity to the magnet. As such, the sensor and/or remote controller may determine that the door to which the sensor is attached is open and/or that a security event (e.g., an alarm condition) is occurring. An indication that the door is open may be provided by the sensor and/or the remote controller to a user device (e.g., the user device 306) and/or to a remote server (e.g., the security server 140). The indication may be a message that also comprises the measured strength of the magnetic field.

If a measured strength of a detected magnetic field from the magnet does not satisfy the first magnetic field strength threshold (e.g., is less than, or less than or equal to, a magnetic field strength associated with the first magnetic field strength threshold) and satisfies the second magnetic field strength threshold (e.g., is greater than, or greater than or equal to, a magnetic field strength associated with the second magnetic field strength threshold), the sensor and/or remote controller may determine that the sensor is not in relatively close proximity to the magnet but that the door is not entirely open. As such, the sensor and/or remote controller may determine that the door to which the sensor is attached is partially open and that no security event is occurring, unless the door remains partially open for some threshold amount of time. For example, the sensor and/or remote controller may determine that the door was opened and is being closed or is only partially opened, such that no security event is occurring but that a security event may occur if the door is not shut within a threshold period of time. An indication that the door is partially open may be provided by the sensor and/or the remote controller to a user device (e.g., the user device 306) and/or to a remote server (e.g., the security server 140). The indication may be a message that also comprises the measured strength of the magnetic field.

Alternatively, the sensor and/or remote controller may determine that a security event is occurring anytime the door is opened—for example, any time the strength of the measured magnetic field does not satisfy the first magnetic field (e.g., is less than, or less than or equal to, a magnetic field strength associated with the first magnetic field strength threshold), and/or any time the strength of the measured magnetic field does not satisfy the first magnetic field but does satisfy the second magnetic field strength threshold (e.g., is greater than, or greater than or equal to, a magnetic field strength associated with the second magnetic field strength threshold). The sensor and/or remote controller may also operate to provide an indication any time that the strength of the magnetic field as measured by the sensor changes by a certain amount. For example, if the strength of the magnetic field changes by a threshold amount (e.g., by a magnetic field strength threshold amount) compared to a prior measurement or set of measurements, the sensor and/or remote controller may provide a corresponding indication. This enables tracking of situations where a door may be partially opened even though the measured strength of the magnetic field satisfies (e.g., is greater than, or greater than or equal to) the second magnetic field strength threshold.

In the third mode of operation, the sensor may be configured to send a signal reporting any measured magnetic field strength to the remote controller. The signal may be generated and transmitted periodically. The signal may indicate a strength of the measured magnetic field. The signal may comprise other parameters or features as described herein. For example, the signal may comprise an indication of a measured temperature and/or an indication of a measured power of a signal received from the remote controller.

The sensor and/or the remote controller may compare any magnetic field measurement made by the sensor to the one or more magnetic field strength thresholds. If the sensor is configured to compare a magnetic field measurement to a magnetic field threshold, the sensor may report an outcome or result of the comparison to the remote controller. For example, if the sensor measures the magnetic field strength as satisfying the first magnetic field strength threshold (e.g., to be greater than, or greater than or equal to a magnetic field strength associated with the first magnetic field strength threshold), the sensor may generate and transmit a signal to the remote controller indicating the same.

The thresholds set in step 528 may be set in any manner. The thresholds may be set by the remote controller based on measurements reported by the sensor during the second mode of operation. Alternatively or additionally, the thresholds may be set based on magnetic field strength measurements made by the sensor in step 528. One or more magnetic field measurements made by the sensor when the door is closed (e.g., as verified or ensured by the installer) may be used to set any threshold value. For example, during the second mode of operation, the installer may cause the door to be closed and for the sensor to detect and report the measured magnetic field strength if the door is closed. The strength of the magnetic field reported may be used to set one or more thresholds. An average of one or more measurements may also be used to set any threshold. An input provided to the sensor and/or the remote controller (e.g., by an installer or a user) may indicate that a particular strength measurement is a measurement of the magnetic field when the door is closed. This particular strength measurement may then be used (e.g., by the remote controller) to set one or more thresholds (e.g., alarm threshold or security event threhsolds0 as described herein.

In step 530, the sensor may detect and measure the magnetic field from the magnet. In step 532, the sensor may compare the measured magnetic field strength (e.g., from step 530) to the first magnetic field strength threshold. If the measured magnetic field strength satisfies the first magnetic field strength threshold (e.g., is greater than, or greater than or equal to, a magnetic field strength associated with the first magnetic field strength threshold), the method may proceed to step 534. If the measured magnetic field strength does not satisfy the first magnetic field strength threshold (e.g., is less than, or less than or equal to, a magnetic field strength associated with the first magnetic field strength threshold), the method may proceed to step 538.

In step 534, the sensor may generate and send a message to the remote controller. The message may indicate that the sensor has determined that the measured magnetic field strength satisfies the first magnetic field strength threshold (e.g., is greater than, or greater than or equal to, a magnetic field strength associated with the first magnetic field strength threshold). The message may also indicate a value of the measured magnetic field strength. The sensor and/or the remote controller, based on the measured magnetic field strength satisfying the first magnetic field strength threshold (e.g., being greater than, or greater than or equal to a magnetic field strength associated with the first magnetic field strength threshold), may determine that the door is closed. As such, the sensor and/or the remote controller may determine that no security event is occurring with respect to the door. An indication of no security even being detected may be provided by the sensor and/or the remote controller to a user device (e.g., the user device 306) or a remote server (e.g., the security monitor server 141).

In step 536, the sensor, the remote controller, the user device, and/or the remote server may determine any changes to the measured magnetic field experienced over time. For example, any changes or trends (e.g., any change in magnitude or rate of change) related to the magnetic field as measured over any period of time may be determined. Any determination as to any change or trend related to the magnetic field determined in step 536 may be used to determine in step 537 whether to adjust one or more thresholds used for comparison. The first magnetic field strength threshold and/or the second magnetic field strength threshold may be modified or changed in step 528.

The sensor, the remote controller, the user device, and/or the remote server may make the determination in step 537 to adjust one or more thresholds based on any determination made in step 536. For example, in step 536, it may be determined that a strength of the magnetic field is trending lower (e.g., is decreasing over time). In step 537, it may be determined that the first magnetic field strength threshold and/or the second magnetic field strength threshold may be modified or changed, based on the rate of change of the magnetic field meeting or exceeding a predetermined rate of change. In other words, if the rate of change of the strength of the measured magnetic field (e.g., as determined in step 536), is determined to meet or exceed the predetermined rate of change (e.g., as determined in step 537), then the method may proceed to step 528 for modification of one or more thresholds.

For example, based on one or more determinations made in step 536, the first magnetic field strength threshold may be determined to be modified to be increased or decreased in step 537 and the first magnetic field strength threshold may be modified (e.g., increased or decreased) in step 528. The first magnetic field strength threshold may be modified based on determining a trend in measurements made by the sensor of the detected magnetic field if the door is closed. For example, a trend in measurements made by the sensor of the detected magnetic field if the door is closed may be determined in step 536 to indicate that the detected magnetic field strength has decreased (e.g., relative to some initial or original detected magnetic field strength). As a result, the first magnetic field strength threshold and/or the second magnetic field strength threshold may be determined to be lowered in step 537 (and correspondingly lowered in step 528) based on, for example, the decrease in the magnetic field strength meeting or exceeding a predetermined value and/or a predetermined rate of change. Similarly, a trend in measurements made by the sensor of the detected magnetic field if the door is closed may be determined in step 536 to indicate that the detected magnetic field strength has increased (e.g., relative to some initial or original detected magnetic field strength). As a result, the first magnetic field strength threshold and/or the second magnetic field strength threshold may be determined to be increased in step 537 (and correspondingly increased in step 528) based on, for example, the increase in the magnetic field strength meeting or exceeding a predetermined value and/or a predetermined rate of change.

In step 536, any number of magnetic field strength measurements made over any period of time may be compared to any number of initial or first magnetic field strength measurements. The initial magnetic field strength measurements may be made during any time during operation of the sensor. Magnetic field strength measurements made subsequent to the initial magnetic field strength measurements may be compared to a lowest initial magnetic field strength measurement, a highest initial magnetic field strength measurement, and/or an average initial magnetic field strength measurement to determine any increasing or decreasing trend in the strength of the magnetic field.

Accordingly, in steps 536-537, the remote controller may determine that recent measurements made by the sensor when the sensor is in close proximity to the magnet (e.g., if the door is closed) indicate a lower measured magnetic field strength as compared to a strength of the magnetic field as measured by the sensor earlier in time (e.g., during the second mode of operation). The lower strength of the measured magnetic field may indicate that the sensor and/or the magnet have been moved from their original installation positions, thereby reducing a strength of the magnetic field measured by the sensor from the magnet if the door is closed. The remote controller may determine that the strength of the magnetic field as measured by the sensor if the door is closed still satisfies the first magnetic field strength threshold (e.g., meets or exceeds the first magnetic field strength threshold); however, the remote controller may determine that the first magnetic field strength threshold should be lowered, to reflect the settling or change in positioning of the sensor and/or the magnet, to avoid any false alarm reporting.

The first magnetic field strength threshold may be determined in step 537 to be adjusted in any manner based on an any measurements made by the sensor—for example, based on comparison of any detected change or trend of the strength of the magnetic field to one or more predetermined magnetic field strength values (e.g., magnitudes) and/or one or more predetermined magnetic field rates of change. As a first example, in step 537, the first magnetic field strength threshold may be determined to be reduced to a lower value based on a determination, in step 536, that a certain number of magnetic field measurements made by the sensor are lower than an initial or benchmark magnetic field strength value. The number of measurements used for evaluation in step 536 may be a sequential number of measurements and may be any number of measurements. As a second example, in step 537, the first magnetic field strength threshold may be determined to be reduced to a lower value based on a determination, in step 536, that the sensor is measuring the magnetic field to be lower than the initial or benchmark magnetic field strength value for a certain amount of time. The amount of time may be any amount of time. As a third example, in step 537, the magnetic field strength threshold may be determined to be reduced to a lower value based on a determination, in step 536, that the sensor is measuring the magnetic field to be lower than the initial or benchmark magnetic field strength value by a certain amount. That is, in step 536, if it is determined that measurement values drop below a certain threshold compared to the initial or benchmark magnetic field strength value, then in step 537 it may be determined that the threshold may be lowered regardless of how many measurements at the lower value were made or what period of time has elapsed. In general, any one or more factors relating to time, measured strength, and frequency of lower measurements may influence whether to lower the threshold. Further, the first magnetic field strength threshold may be reduced by a certain amount (e.g., a certain value or magnitude) or the first magnetic field strength threshold may be reduced by a certain percentage of the initial or benchmark magnetic field strength value.

The initial or benchmark magnetic field measurement relied on in step 536 may be based on a prior measurement or set of measurements made by the sensor and used to establish a benchmark measurement. For example, one or more measurements made by the sensor during the second mode of operation may be used in step 536 to determine the benchmark magnetic field measurement. As another example, one or more measurements made by the sensor during the third mode of operation may be used in step 536 to determine the benchmark magnetic field measurement.

Multiple measurements may be averaged to form the benchmark magnetic field measurement. A maximum value or a median value of one or more measurements may be used to determine the benchmark magnetic field measurement.

For example, a first set of measurements of the strength of the magnetic field may be made by the sensor. The first set of measurements may comprise two or more measurements. The first set of measurements may be made when the door is closed and may be made if the sensor is operating in the second mode of operation or the third mode of operation. The first set of measurements may be averaged to generate an average measurement of the strength of the magnetic field when the door is closed. The first magnetic field strength threshold may be set to be a first amount less than the average measurement of the strength of the magnetic field. The first amount may be any value or any portion of the average measurement of the strength of the magnetic field. The sensor may operate for a period of time based on the first magnetic field strength threshold set in this manner. After a period of time, a second set of measurements may be averaged to generate a second average measurement of the strength of the magnetic field when the door is closed. In step 536, the first set of measurements and the second set of measurements may be compared. Results of any comparison may be evaluated in step 537. The second average measurement of the strength of the magnetic field may be less than the initial or first average measurement of the strength of the magnetic field. If the second average measurement of the strength of the magnetic field is lower than the first average measurement of the strength of the magnetic field by a predetermined threshold (e.g., an average measurement change threshold), then in step 537 the first magnetic field strength threshold may be determined to be modified based on the second average measurement of the strength of the magnetic field determined in step 536. For example, the first magnetic field strength threshold may be determined to be set to be lower than the second average measurement of the strength of the magnetic field by the first amount. In this manner, the first magnetic field strength threshold may be dynamically modified (e.g., via steps 536, 537, and 528) to account for slight variations in the positioning and/or orientation of the sensor after extended use. If the second average measurement of the strength of the magnetic field is lower than the first average measurement of the strength of the magnetic field by a second predetermined threshold (e.g., an alert threshold), the sensor and/or remote controller may provide an indication that the sensor may be incorrectly installed or requires attention. The alert threshold may be set to any amount and may be set so as to reflect that the average measurement is now so low that it likely indicates a flaw in the positioning of the sensor.

If the evaluation of step 537 concludes that a threshold should be adjusted (e.g., the first magnetic field strength threshold), the method may proceed to step 528 as shown. In step 528, one or more thresholds used by the sensor and/or the remote controller may be adjusted or modified in any manner. If the evaluation of step 537 concludes that a threshold should not be adjusted (e.g., the first magnetic field strength threshold), the method may proceed to step 530 as shown. In this manner, operation in the third mode of operation continues as the sensor is repeatedly operating to determine if a security event is occurring (e.g., to determine if the door is opened).

Proceeding to step 528 may allow the remote controller to modify one or more thresholds. The remote controller may send a message to a user device indicating a need to adjust one or more thresholds. The message may indicate that the sensor may be malfunctioning and/or requires inspection or attention. The message may be a reporting message that requests approval to modify one or more thresholds and/or that provides an alert regarding a potential or possible problem with the Hall effect sensor and/or the corresponding magnet. The alert may indicate or may be interpreted as indicating that there is a potential problem with the Hall effect sensor and/or the corresponding magnet such as, for example, that there has been a change in an alignment or a positioning of the Hall effect sensor and/or the corresponding magnet which may have caused the Hall effect sensor to measure lower strengths of the magnetic field (e.g., when a door is closed).

The remote controller may modify one or more thresholds automatically or may adjust one or more thresholds responsive to a user input (e.g., issued via a user interface of a user device). The user input may be a command or instruction specifying one or more values to use for the corresponding one or more thresholds to adjust. The user input may be a command or instruction specifying that modification of the one or more thresholds is allowable or approved by the user (e.g., that the request to reduce one or more thresholds is approved). For example, the remote controller may send a message to the user device indicating a need to adjust a threshold value and may provide a suggested modified threshold value. The message may request approval to reduce the threshold value. The user device, based on an input from the user, may issue a reply message indicating approval of the modification to the threshold value.

The remote controller may adjust a first threshold to generate a second threshold. The second threshold may be set to be a predetermined amount less than a lowest measured strength of one or more measured strengths of the magnetic field made by the sensor that the remote controller used to determine a reduction in a strength of the magnetic field. Alternatively, the second threshold may be set to be a predetermined amount less than an average measured strength of one or more measured strengths of the magnetic field made by the sensor that the remote controller used to determine a reduction in a strength of the magnetic field.

The remote controller may send one or more messages to the user device indicating any determined reduction in the strength of the magnetic field and/or any determined downward trend in the strength of the magnetic field. The remote controller may send a message indicating a false alarm condition if a measured strength of the magnetic field does not satisfy an initial alarm threshold (e.g., is less than, or less than or equal to, a magnetic field strength associated with an initial alarm threshold) and if the remote controller has determined a reduction in a strength of the magnetic field. As the remote controller has determined that an installation of the sensor and/or the magnet likely requires adjustment, based on determining the reduction in the strength of the magnetic field, the remote controller may avoid issuing an alarm condition when a subsequent measurement does not satisfy the initial alarm threshold (e.g., is less than, or less than or equal to a magnetic field strength associated with the initial alarm threshold) before the initial alarm threshold has been modified. Instead, the remote controller may send a message to the user device that a false alarm condition is occurring which may trigger the user to adjust a positioning of the sensor and/or the magnet (e.g., if a subsequent measured strength of the magnetic field is determined to be below the initial alarm threshold but above the modified alarm threshold). The message indicating the false alarm condition may also inform the user that a security event is not occurring (e.g., a door is closed although a measured strength of the magnetic field may falsely indicate the door is open).

As previously mentioned, the method may proceed to step 538 if it is determined in step 532 that the measured strength of the magnetic field does not satisfy the first magnetic field strength threshold (e.g., is less than, or less than or equal to, a magnetic field strength associated with the first magnetic field strength threshold). In step 538, the sensor may compare the measured magnetic field strength (e.g., from step 530) to the second magnetic field strength threshold. If the measured magnetic field strength does not satisfy the second magnetic field strength threshold (e.g., is less than, or less than or equal to, a magnetic field strength associated with the second magnetic field strength threshold), the method may proceed to step 540. If the measured magnetic field strength does satisfy the second magnetic field strength threshold (e.g., is greater than, or greater than or equal to, a magnetic field strength associated with the second magnetic field strength threshold), the method may proceed to step 544.

In step 540, the sensor may generate and send a message to the remote controller. The message may indicate that the sensor has determined that the measured magnetic field strength does not satisfy the second magnetic field strength threshold (e.g., is less than, or less than or equal to, a magnetic field strength associated with the second magnetic field strength threshold). The message may also indicate a value of the measured magnetic field strength. The sensor and/or the remote controller, based on the measured magnetic field strength not satisfying the second magnetic field strength threshold (e.g., being less than, or less than or equal to, a magnetic field strength associated with the second magnetic field strength threshold), may determine that the door is open. As such, the sensor and/or the remote controller may determine that a security event is occurring with respect to the door. An indication of the security event being detected may be provided by the sensor and/or the remote controller to the user device (e.g., the user device 306) and/or a remote server (e.g., the security monitor server 140).

The sensor and/or the remote controller in step 540 may provide a variety of indications of the determined security event with respect to the door. The sensor and/or the remote controller may provide one or more visual, audible, or tactile alerts that may be noticed by an individual. For example, the sensor may illuminate one or more LEDs 404. The sensor and/or the remote controller may also send one or more messages to the user device (e.g., the user device 306) to alert a user as to the detected security event. The one or more messages may indicate which door is determined to be open. The one or more messages may also indicate additional information such as for how long the door has been determined to be opened (e.g., based on one or more measurements of the magnetic field strength being determined to be less than the second magnetic field strength threshold).

The sensor and/or the remote controller may continue to measure the strength of the magnetic field in step 540 to determine if the door remains opens or if the door is closed. For example, the sensor may periodically remeasure the strength of the magnetic field while in step 540 and may compare any new measurement to the first magnetic field strength threshold or the second magnetic field strength threshold.

The method may proceed to step 542 if the sensor and/or the remote controller determine that the security event detected and/or reported in step 540 has been cleared. The security event may be cleared in a number of manners. For example, a user of the user device may clear the security event determined in step 540. The user may clear the security event, for example, if the user authorized the door being opened or is aware of someone using the door. The door may be a backdoor that is normally kept closed. A handy man may use the backdoor to service the house in a manner that the owner of the house authorizes and is aware. As such, if the security event of the backdoor is reported to the user via the user device, the user may make note of the alert and dismiss and/or clear it, such that the method proceeds to step 542. In step 542, a record or log of the security event and its clearance may be stored.

As another example of clearing the security event, the sensor may continue to measure the detected magnetic field and may determine the security event is over (e.g., the door is closed) if the sensor measures a magnetic field strength that satisfies the first magnetic field strength threshold (e.g., is greater than, or greater than or equal to a magnetic field strength associated with the first magnetic field strength threshold). Based on a subsequent measurement of the magnetic field strength being determined to satisfy the first magnetic field strength threshold (e.g., greater than, or greater than or equal to, a magnetic field strength associated with the first magnetic field strength threshold), the sensor and/or the remote controller may determine the door has been closed such that the security event is over or resolved. The sensor and/or the remote controller may generate and send a message to the user device indicating the clearance of the security event (e.g., including a reason why the event has been cleared). The sensor and/or the remote controller may determine the door is closed based on a single subsequent measurement satisfying the first magnetic field strength threshold (e.g., meeting or exceeding the first magnetic field strength threshold). Alternatively, the sensor and/or the remote controller may determine the door is closed based on a certain number of subsequent measurements (e.g., sequential measurements) satisfying the first magnetic field strength threshold (e.g., meeting or exceeding the first magnetic field strength threshold).

Once the security event is cleared, the method may proceed from step 542 to step 530 for the sensor to continue operating to detect, measure, and report the strength of the magnetic field to determine a status of the door.

If it is determined in step 538 that the measured strength of the magnetic field satisfies the second magnetic field strength threshold (e.g., is greater than, or greater than or equal to, a magnetic field strength associated with the second magnetic field strength threshold), the sensor and/or the remote controller may determine that the door is partially opened and/or may be in a process of being used (e.g., may be being opened or may be being closed). As such, the sensor and/or the remote controller may not determine that a security event is occurring. The sensor and/or the remote controller may generate and send a message to the user device indicating the determination of step 544. The message may indicate a value of the measured magnetic field strength.

The sensor and/or the remote controller may determine a security event is not occurring in step 544 based on prior configuration of the sensor and/or the remote controller. For example, the user of the user device may specify that only if the door is likely fully open should a security event be determined. As such, measurements that satisfy the second magnetic field strength threshold (e.g., meet or exceed the second magnetic field measurement threshold) may not be flagged as a security event. Further, the user may specify that short use of the door to temporarily open and close the door are not be flagged as security events. Instead, for example, the user may specify that the sensor and/or the remote controller are to determine a security event related to the door is occurring only if the door is determined to be open for a certain number of measurements or a certain amount of time. In this manner, the security system allows for user customization of alert indications and handling.

Alternatively, if the sensor and/or the remote controller reach step 544, the sensor and/or the remote controller may determine a security event has occurred, for example, if the sensor and or the remote controller have been configured to treat a measurement value that does not satisfy the first magnetic field strength threshold (e.g., is less than, or less than or equal to, a magnetic strength associated with the first magnetic strength threshold) and does satisfy the second magnetic field strength threshold (e.g., is greater than, or greater than or equal to, a magnetic field strength associated with the second magnetic field strength value) in such a manner. Under any scenario, the sensor and/or the remote controller may generate and send a message to the user device to indicate a determined state of the door and a reported value of the magnetic field measurement. In this manner, the user of the user device is aware of the state of the door and may adjust operation of any device to reflect whether such a circumstance would be treated as a security event or not. The user may be provided with an option for responding to the determined security event.

After step 544, the method may proceed again to step 530, to allow the sensor to continue to monitor, measure, and report the value of the magnetic field strength. The method may proceed to step 530 based on resolution of any security event determined in step 544 and/or based on resuming operation after determining no security event occurred in step 544.

Figure 6:
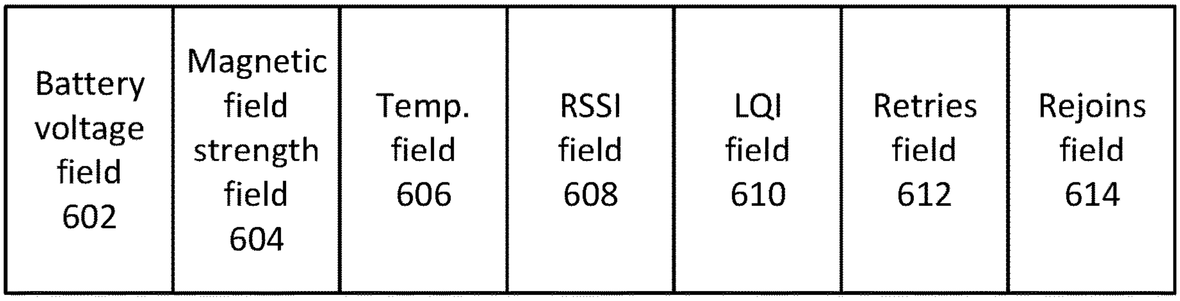
FIG. 6 shows a first example message.

FIG. 6 shows an example magnetic field strength check-in reporting message 600. The magnetic field strength check-in reporting message 600 may be a check-in message or a check-in reporting message. The check-in reporting message 600 may be generated by a sensor (e.g., the sensor 302 or the sensor 400) and may be transmitted by the sensor to a controller (e.g., the remote controller 304). The check-in reporting message 600 may represent a portion of an entire or complete message generated and transmitted by the sensor. For example, the check-in reporting message 600 may represent a portion of an overall message (or a portion of an overall payload) generated and transmitted by the sensor. The sensor may periodically generate the check-in reporting message 600 and transmit it to a controller.

As shown in FIG. 6, the check-in reporting message 600 may comprise different portions or fields 602 through 614. The check-in reporting message 600 may be a modified Zigbee message. Specifically, the check-in reporting message 600 may have an extended payload compared to a typical Zigbee message, which may comprise no payload and therefore none of the fields shown in FIG. 6. Each of the fields 602-614 may be newly added components of a message that conforms to the Zigbee protocol.

The check-in reporting message 600 may be sent by the sensor to the remote controller at any time including, for example, on a periodic basis. For example, the check-in reporting message 600 may be generated and transmitted by the sensor every 27 minutes. The remote controller may use any data or information provided by the check-in reporting message 600 to adjust operation of the sensor and/or the remote controller. For example, the remote controller may use the check-in reporting message 600 to adjust one or more thresholds used for comparison to any magnetic field strength measurement made by the sensor.

A first field 602 of the check-in reporting message 600 may provide an indication of a battery voltage of the sensor. The first field 602 may comprise 16 bits and may indicate the battery voltage as an unsigned integer value. The battery voltage may be expressed in millivolts (mV).

A second field 604 of the check-in reporting message 600 may provide an indication of a magnetic field strength measured by the sensor. The second field 602 may comprise 16 bits and may indicate the magnetic field strength as an unsigned integer value. The magnetic field strength may be expressed in milliTeslas (mT).

A third field 606 of the check-in reporting message 600 may provide an indication of a temperature measured by the sensor. The third field 606 may comprise 16 bits and may indicate the temperature as an integer value. The temperature may be expressed in Celsius.

A fourth field 608 of the check-in reporting message 600 may provide a received signal strength indicator (RSSI) (or an indicator of a received signal strength) measured by the sensor. RSSI may be an indication of a strength of a signal received by the sensor from the remote controller. The RSSI field 608 may comprise 8 bits and may indicate the RSSI as an integer value. The RSSI may be expressed in Watts (W), milliwatts (mW), or decibel-milliwatts (dBm).

A fifth field 610 of the check-in reporting message 600 may provide a link quality indicator (LQI) (or an indicator of a link quality) measured by the sensor. The LQI may be an indication of a quality of a signal received by the sensor from the remote controller. The LQI may be expressed as a bit error rate (BER). The LQI field 610 may comprise 8 bits and may indicate the LQI as an unsigned integer value. The LQI may provide an indication of interference experienced by the sensor and may supplement information provided by the RSSI field 608. For example, if the sensor is operating in a high interference environment, the sensor may receive a strong signal from the remote controller (indicative of a relatively high RSSI) but may have difficulty processing the contents of the signal due to the interference. As such, the LQI field 610 provides an indication of interference and the ability of the sensor to effectively use the signal it receives from the remote controller.

A sixth field 612 of the check-in reporting message 600 may provide a count of a number of retries for sending the check-in reporting message 600. The sixth field 612 may comprise 32 bits and may indicate the number of retries as an unsigned integer value. On a first attempt to send the check-in reporting message 600, a value of the retries field 612 may be set to zero (0). If the sensor fails to receive a message from the remote controller acknowledging receipt of the message after it is first attempted to be sent to and received by the remote controller, the sensor may attempt to re-send the check-in reporting message 600. On a second attempt to send the check-in reporting message 600, the value of the retries field 612 may be set to one (1), to reflect that the sensor is retrying a first time to re-send the check-in reporting message 600. The value comprised in the reties field 612 may be incremented by one (1) each time the check-in reporting message 600 is re-sent by the sensor. The check-in reporting message 600 may be sent by the sensor any number of times until the sensor receives a message from the remote controller acknowledging receipt of the check-in reporting message 600.

A seventh field 614 of the check-in reporting message 600 may provide a count of a number of times the sensor has rejoined a network to enable communication with the remote controller. The seventh field 614 may comprise 32 bits and may indicate the number of rejoins as an unsigned integer value. Occasionally, the sensor may lose connectivity with the remote controller, which may prevent messages from the remote controller reaching the sensor or messages from the sensor reaching the remote controller. The rejoins field 614 may provide an indication of a number of times the sensor has had to re-initiate communications with the remote controller and may indicate whether the network (e.g., the network 308) over which the sensor and remote controller communication is stable or unreliable. The rejoins field 614 may provide an absolute count of the number of times the sensor has had to rejoin the network to maintain communications with the remote controller.

The check-in reporting message 600 may comprise additional fields or fewer fields than those shown in FIG. 6. For example, during installation or steady-state use of a sensor, the RSSI field 608 may indicate a relatively strong signal being received by the sensor while the LQI field 610 may indicate that the signal being received by the sensor is of relatively low quality (e.g., has a relatively high BER). Based on these indications provided in the check-in reporting message 600, the remote controller may provide an indication to the user (e.g., via the user device 306) that the reception quality of the sensor is poor. The remote controller may provide an indication that the user should inspect the sensor to determine if re-installation/re-positioning of the sensor may be needed. For example, if the LQI field 610 indicates that the BER satisfies (e.g., is greater than, or greater than or equal to) a predetermined threshold (e.g., BER threshold), the remote controller may provide one or more such indications to the user.

Any device such as, for example, the remote controller 304, the user device 308, and/or the security monitor server 140 may use any data provided in the magnetic field strength field 604 to determine any trends (e.g., increases or decreases) related to measurements of the magnetic field strength if, for example, the door to which the sensor is attached is closed. Any number of measurements may be analyzed to determine any trend. A trend may show a decrease in the measured strength of the magnetic field over time if the door is closed. A trend may show an increase in the measured strength of the magnetic field over time if the door is closed. Any trend may be recognized or determined based on comparison of any current set of measurement data to any prior set of measurement data. For example, measured magnetic field strength data provided in the magnetic field strength field 604 may indicate that the measured magnetic field strength when the door is closed is consistently relatively lower than when the sensor is first installed. Over time, measured magnetic field strength data provided in the magnetic field strength field 604 may indicate that the measured magnetic field strength when the door is closed is trending lower over time, and eventually stabilizing to a level that is lower than the consistently relatively high measurements previously made. Similarly, for example, measured magnetic field strength data provided in the magnetic field strength field 604 may indicate that the measured magnetic field strength when the door is closed is consistently relatively higher than when the sensor is first installed. Over time, measured magnetic field strength data provided in the magnetic field strength field 604 may indicate that the measured magnetic field strength when the door is closed is trending higher over time, and eventually stabilizing to a level that is higher than the consistently relatively high measurements previously made. Based on determinations of such trends and changes in measurement values over time, one or more thresholds for detecting if the door is open or closed may be adjusted (e.g., increased or decreased) as described herein. Further, early warning signs of potential installation issues may be identified prior to a sensor indicating that the door is open when the door is in fact closed, for example, based on relatively weak magnetic field measurements being made due to positioning or alignment issues of the sensor or corresponding magnet. Likewise, early warning signs of potential installation issues may be identified prior to a sensor indicating that the door is closed when the door is in fact open, for example, based on relatively strong magnetic field measurements being made due to positioning or alignment issues of the sensor or corresponding magnet.

Figure 7:
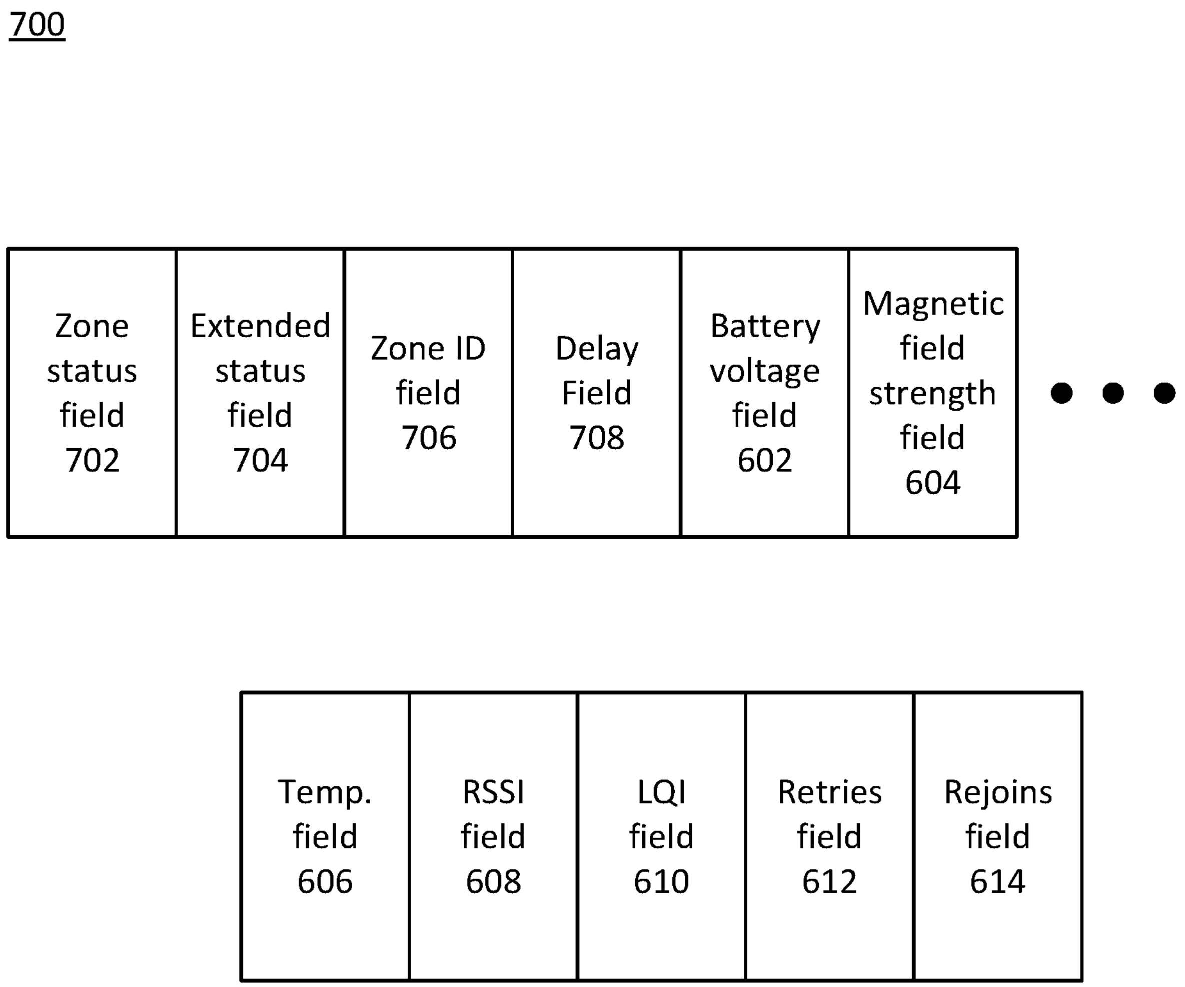
FIG. 7 shows a second example message.

FIG. 7 shows an example magnetic field zone event reporting message 700. The magnetic field zone event reporting message 700 may be a zone event reporting message or an event reporting message. The event reporting message 700 may be generated by a sensor (e.g., the sensor 302 or the sensor 400) and may be transmitted by the sensor to a controller (e.g., the remote controller 304). The event reporting message 700 may represent a portion of an entire or complete message generated and transmitted by the sensor. For example, the event reporting message 700 may represent a portion of an overall message (or a portion of an overall payload) generated and transmitted by the sensor.

As shown in FIG. 7, the event reporting message 700 may comprise different portions or fields 702 through 708, along with the fields 602-614 contained in the check-in reporting message 600. The event reporting message 700 may be a modified Zigbee message. Specifically, the event reporting message 700 may have an extended payload compared to a message that conforms to the Zigbee protocol. Each of the fields 602-614 may be newly added components of a typical Zigbee message (e.g., a zone event reporting message). As such, the fields 610-614 may represented a modified payload.

The event reporting message 700 may be sent by the sensor to the remote controller in response to a change in a magnetic field strength as measured by the sensor. For example, the event reporting message 700 may be generated and transmitted by the sensor whenever the magnetic field strength measured by the sensor changes by a threshold amount (e.g., by a threshold value, magnitude, or percentage change compared to a prior value). The event reporting message 700 may therefore be used to report a change in a status of an object to which the sensor is attached.

For example, if the sensor is attached to a door and the door is opened after being closed for a substantial period of time, the magnetic field strength measured by the sensor when the door is open will be significantly weaker than the magnetic field strength measured by the sensor when the door is closed. If the change in the measured magnetic field strength satisfies a predetermined threshold (e.g., meets or exceeds a predetermined threshold), the sensor may generate and transmit the event reporting message 700. In doing so, the event reporting message 700 may be used to indicate if a door is opened and/or if a door is closed. The remote controller may use any data or information provided by the event reporting message 700 to indicate a security event. For example, based on receipt of the event reporting message 700, the remote controller may provide a message to a user device (e.g., the user device 306) and/or a remote server (e.g., the security monitor server 140) indicating that a security event is occurring with respect to the door (e.g., the door has either been opened or closed). The predetermined threshold may be set to any value or percentage.

A first field 702 of the event reporting message 700 may provide an indication of a status of a zone associated with the sensor. For example, the sensor may be attached to a door which may be a zone being monitored (e.g., the by monitoring system 300). The zone status field 702 may indicate a current status of the zone—such as, for example, whether a security event is occurring with respect to the zone. For example, zone status field 702 may indicate whether the door has been opened or if the door has been closed. The zone status field 702 may comprise a bitmap of 16 bits.

A second field 704 of the event reporting message 700 may provide extended zone status information. By default, the extended zone status field 704 may be set to zero (0). The zone status field 702 may comprise a bitmap of 8 bits.

A third field 706 of the event reporting message 700 may indicate a zone identification (ID). The zone ID field 706 may provide further information for identifying the zone or particular door to which the sensor is attached. The zone ID field 706 may comprise 8 bits and may indicate the zone ID as an unsigned integer value.

A fourth field 706 of the event reporting message 700 may indicate a delay parameter. The delay parameter field 708 may provide an indication of an amount of time (e.g., in quarter-seconds) between the sensor detecting a change in the measured strength of the magnetic field that satisfies the predetermined threshold (e.g., is greater than, or greater than or equal to, a magnetic field strength associated with the predetermined threshold) to when the event reporting message 700 is transmitted. The delay parameter field 708 may allow the remote controller to assess congestion of the network (e.g., the network 308) that is used for communications between the sensor and the remote controller.

The remaining fields 602 through 614 of the event reporting message 700 may be the same as or similar to the corresponding fields shown and described in relation to FIG. 6. The event reporting message 700 may comprise additional fields or fewer fields than those shown in FIG. 7.

Figure 8:
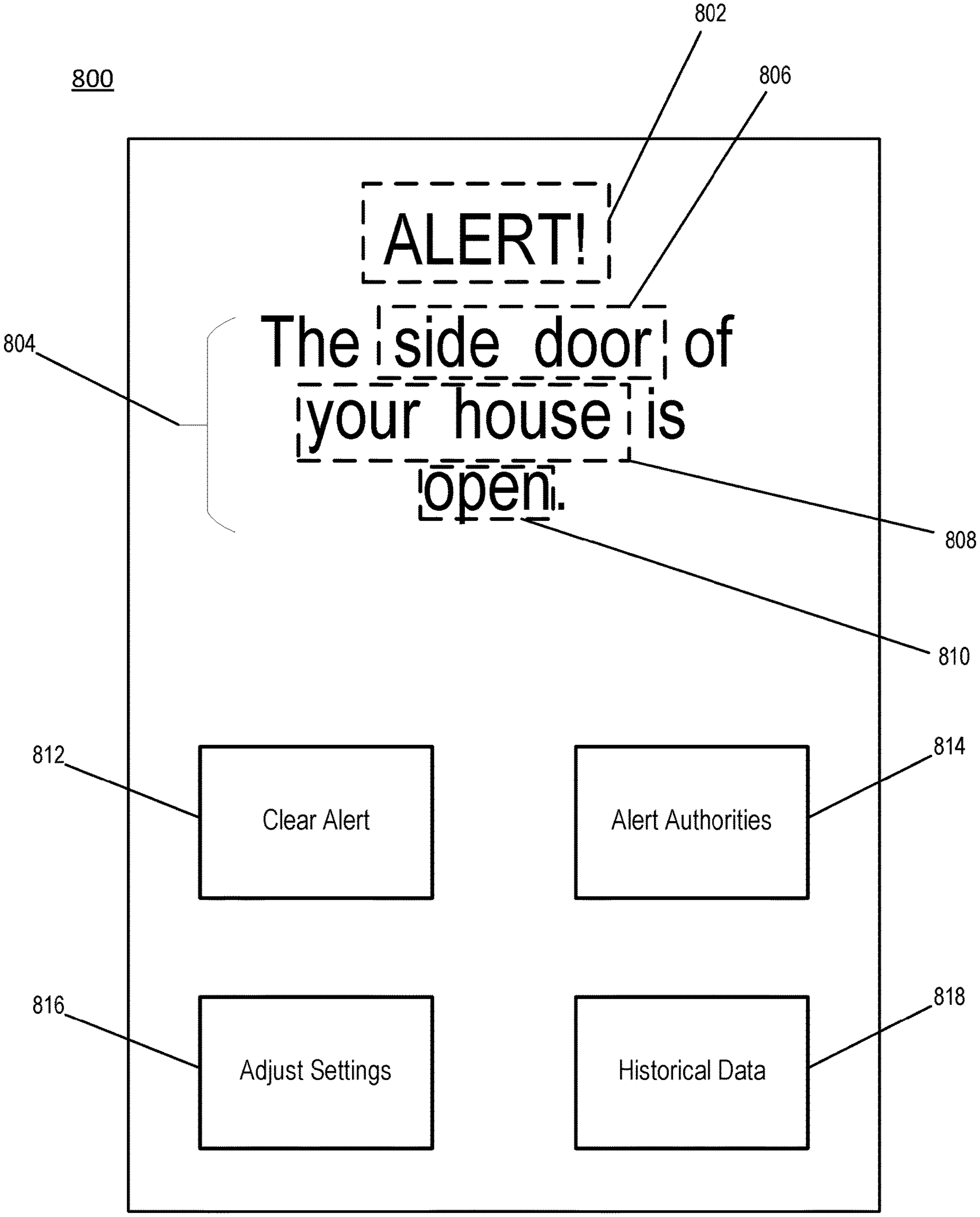
FIG. 8 shows an example user interface.

FIG. 8 shows an example user interface 800. The user interface 800 may be provided on any device described herein including, for example, a mobile user device (e.g., the user device 306). The user interface 800 may be part of an application (app) provided on a mobile user device (e.g., a smartphone). The user interface 800 may provide information regarding a status of operation of a security monitoring system as described herein (e.g., the system 300). The user interface 800 may provide information regarding a status of operation of any individual component of the security monitoring system (e.g., the sensor 302, the sensor 400, the remote controller 304, and/or the security monitor server 140). The user interface 800 may provide information regarding a determined security event (e.g., alert a user if a door is opened).

The user interface 800 may provide data or information using any graphical, visual, audible, and/or tactile indicators, or any combination thereof. The user interface 800 may enable a user to determine the status of a particular sensor. For example, the user interface 800 may provide information as to whether a particular sensor is on or off, the amount of battery life left, and/or whether the sensor has connectivity to a remote controller. The user interface 800 may enable a user to determine the status of the remote controller. For example, the user interface 800 may provide information as to whether the sensor is on or off, the amount of battery life left, whether the remote controller has connectivity to a particular sensor, whether the remote controller has connectivity to the remote server, and/or whether the remote controller has connectivity to the user device.

The user interface 800 may provide data that is collected or determined by any sensor. For example, the user interface 800 may provide information regarding signal strength measurements and/or magnetic field strength measurements made by a particular sensor. Further, with regard to a particular sensor, the user interface 800 may provide information regarding any current measurement made by the sensor, any history of measurements made by the sensor, and any trends related to measurements made by the sensor (e.g., whether magnetic field strength measurements made when the door are closed are stable or trending lower over time).

The user interface 800 may provide data regarding any object being monitored by the security system (e.g., a door or a window). For example, the user interface 800 may provide information regarding whether a door is open or closed, a history of use of the door, when the door was last opened, and/or how long the door was last opened. The user interface 800 may provide alerts or notifications as to whether a door is currently open, partially open, or closed. The user interface 800 may also provide information to identify each monitored object uniquely (e.g., a unique door ID or name) and may provide a history of all magnetic field strength measurements related to the monitored object.

The user interface 800 may provide alerts or indications as to any change in operation of any component (e.g., any sensor) of the security system. For example, the user interface 800 may provide an indication that a magnetic field strength as measured by a particular sensor if a door to which the sensor is attached is lower than a magnetic field strength measured by the sensor earlier in time (e.g., during installation or shortly thereafter). The user interface 800 may provide an indication of any trend in the change in the magnetic field strength measurements made by the sensor and may indicate if current measurements are a threshold amount below an initial or benchmark measurement of the magnetic field strength when the door is closed. The user interface 800 may provide a recommend change to any magnetic field strength measurement thresholds to the user. The user interface 800 may allow the user to manage any changes to any magnetic field strength measurement thresholds including, for example, permitting the user interface 800 to make automatic adjustments or requesting any recommended change be approved by the user. If changes to measurements drop significantly (e.g., are less than the initial or benchmark measurement by a further threshold), the user interface 800 may alert the user that a more significant issue regarding the installation or positioning of the sensor may be occurring and may suggest that a visual inspection of the sensor should be made.

The user interface 800 may allow a user to set or adjust any preferences or preferred operations of the security system. For example, for a particular object being monitored (e.g., a door), the user interface 800 may allow a user to set a preference for whether to be alerted about the battery life remaining in an associated sensor. The user interface 800 may allow a user to specify whether to be alerted about a security event—for example, whether and how to be alerted if a door is opened, if a door is closed, and/or if a door is partially opened. The user interface 800 may allow a user to specify that no alert is to be provided for a door that is partially opened unless the door remains partially opened for more than a threshold amount of time.

Other data and information may be provided by the user interface 800 including any other data or information collected or generated by any component of the security system. For example, the user interface 800 may provide temperature information, motion detection information, smoke detection information, and/or moisture detection information for different areas of a premises (e.g., the premises 102*a*) based on data collected and/or processed by any sensor.

As shown in FIG. 8, the user interface 800 is providing an alert to a user related to a particular object being monitored by a particular sensor of the security monitoring system. The alert may comprise textual information 802 to convey an urgency associated with the alert. The user interface 800 may provide a description 804 of the alert. The description 804 may be provided in a narrative style. The description 804 may comprise a description or ID of the object 806 (e.g., the "side door"), a description or ID of the premises 808 (e.g., "your house"- to distinguish multiple premises that may be monitored), and/or an indication of a security event related to the object 810 (e.g., that the side door is "open").

As further shown in FIG. 8, the user interface 800 may provide options for a user to respond to the alert 802. For example, the user interface 800 may provide the user with a first option 812 to clear the indicated alert and/or may provide the user with a second option 814 to alert the authorities regarding the security event. A user may choose the second option 814, for example, if the user determines the security event is serious and the user is not at the premises where the security event is taking place. If a user engages the second option 814, an automatic phone call or other notification may be provided to a local police or fire department. If a user engages the first option 812, the alert 802 may be removed from the user interface 800.

The user interface 800 may provide the user with a third option 816 to adjust or modify any operation settings relating to the security system or a particular system. If a user engages the third option 816, for example, one or more menus may be presented to the user for adjusting any operation of a particular sensor. The user interface 800 may provide the user with a fourth option 818 to view any measurement history data or notification history data related to a particular monitored object or associated sensor. If a user engages the fourth option 818, for example, one or more menus may be presented to the user to view a history of any data collected by a particular sensor (e.g., a history of magnetic field strength measurements, a history of received signal power strength measurements, a history of temperature measurements, etc.) and/or a history of any notifications associated with an object or sensor (e.g., when the last notification regarding a particular door was made, how the notification was resolved, etc.).

Although examples are provided in the context of a sensor attached to a door or window and a magnet attached to a corresponding door frame or window frame, respectively, the apparatuses, systems, and methods described herein are not so limited. The apparatuses, systems, and methods described herein may be used with any type of structure that includes a first element (or object) that is moveable relative to a second element (or object). The apparatuses, systems, and methods described herein may be used to detect a movement of the first element based on positioning the sensor on the first element and positioning the magnet on the second object. Alternatively, the apparatuses, systems, and methods described herein may be used to detect a movement of the first element based on positioning the magnet on the first element and positioning the sensor on the second object. The first element may be any physical element such as, for example, a hatch, a cabinet door, a first portion of a French door or double door, or a drawer and the second element may be any corresponding physical element such as, for example, a bulkhead, a cabinet frame, a wall, a second portion of a French door or double door, or a dresser or office cabinet. The apparatuses, systems, and methods described herein may use various predetermined thresholds, levels, or values as described herein. Any predetermined threshold, level, or value may be prestored or hard coded into any of the devices described herein or may be set by a user.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
- receiving, by a computing device and from a sensor, a first message indicating a first measured strength of a magnetic field;
- causing, by the computing device and based on the first measured strength of the magnetic field, setting of a first threshold, for detecting an alarm condition;
- determining, by the computing device and based on a plurality of messages, from the sensor, indicating a corresponding plurality of measured strengths of the magnetic field, a reduction in a strength of the magnetic field;
- sending, from the computing device to a user device, a second message comprising:
  - an indication of a potential problem with the sensor; and
  - a request to modify the first threshold; and
- causing, by the computing device and based on an instruction from the user device, setting of a second threshold, lower than the first threshold, for detecting the alarm condition.

2. The method of claim 1, wherein the second message further comprises a proposed modified threshold value.

3. The method of claim 1, wherein determining the reduction in the strength of the magnetic field further comprises determining that each measured strength of the plurality of measured strengths of the magnetic field is within a predetermined range of the first threshold.

4. The method of claim 1, wherein determining the reduction in the strength of the magnetic field further comprises determining that each measured strength of the plurality of measured strengths of the magnetic field is lower than the first measured strength of the magnetic field by at least a predetermined amount.

5. The method of claim 1, wherein causing setting of the first threshold further comprises causing setting of the first threshold to be a predetermined amount less than the first measured strength of the magnetic field.

6. The method of claim 1, wherein causing setting of the second threshold further comprises causing setting of the second threshold to be a predetermined amount less than a lowest measured strength of the corresponding plurality of measured strengths of the magnetic field.

7. The method of claim 1, wherein causing setting of the second threshold further comprises causing setting of the second threshold to be a predetermined amount less than an average measured strength of the corresponding plurality of measured strengths of the magnetic field.

8. The method of claim 1, wherein the instruction from the user device comprises approval of a proposed modified threshold value.

9. The method of claim 1, wherein the second message further comprises an indication of indicating the reduction in the strength of the magnetic field.

10. The method of claim 1, wherein causing setting of the second threshold further comprises causing setting of the second threshold based on a user input.

11. The method of claim 1, further comprising:
receiving, by the computing device and from the sensor, a third message indicating a second measured strength of the magnetic field;
comparing, by the computing device, the second measured strength of the magnetic field to the second threshold; and
sending, from the computing device and to a user device, a fourth message indicating the alarm condition based on the second measured strength of the magnetic field not satisfying the second threshold.

12. The method of claim 1, further comprising:
receiving, by the computing device and from the sensor, and prior to causing setting of the second threshold, a third message indicating a second measured strength of the magnetic field;
determining, by the computing device, that the second measured strength of the magnetic field does not satisfy the first threshold; and
sending, from the computing device and to a user device, a fourth message indicating a false alarm condition, based on determining the reduction in the strength of the magnetic field.

13. A method comprising:
receiving, by a computing device and from a sensor, a first message indicating a first measured strength of a magnetic field;
setting, by the computing device and based on the first measured strength of the magnetic field, a threshold for detecting an alarm condition;
determining, by the computing device and based on a plurality of messages, from the sensor, indicating a corresponding plurality of measured strengths of the magnetic field, a downward trend in a strength of the magnetic field; and
sending, by the computing device and to a user device, and based on determining the downward trend in the strength of the magnetic field, a second message comprising:
an indication of a potential problem associated with the sensor; and
a request to modify the threshold.

14. The method of claim 13, further comprising receiving, by the computing device and based on sending the second message, a third message instructing the computing device to reduce the threshold.

15. The method of claim 13, further comprising causing, by the computing device and based on user approval of a proposed modified threshold value, setting a modified threshold, lower than the threshold, for detecting the alarm condition.

16. The method of claim 13, further comprising:
receiving, by the computing device and from the sensor, a third message indicating a second measured strength of the magnetic field;
determining, by the computing device, that the second measured strength of the magnetic field does not satisfy the threshold; and
sending, by the computing device and to the user device, and based on determining the downward trend in the strength of the magnetic field, a fourth message indicating a false alarm condition.

17. A method comprising:
determining, by a computing device and based on one or more first messages from a sensor indicating first measured strengths of a magnetic field, a reduction in a strength of the magnetic field;
sending, by the computing device and to a user device, a request to modify an original threshold for detecting a security event;
causing, by the computing device and based on determining the reduction in the strength of the magnetic field, setting of a modified threshold for detecting the security event, wherein the modified threshold is set to be lower than the original threshold; and
determining, by the computing device, that the security event is not occurring based on a second message from the sensor indicating a second measured strength of the magnetic field that does not satisfy the original threshold and satisfies the modified threshold.

18. The method of claim 17, wherein the request further indicates that a change in a position of the sensor may have occurred.

19. The method of claim 17, wherein causing setting of the modified threshold further comprises causing setting of the modified threshold to be a predetermined amount less than a lowest measured strength of the first measured strengths of the magnetic field.

20. The method of claim 17, further comprising:
receiving, by the computing device and from the sensor, and prior to causing setting of the modified threshold, a third message indicating a third measured strength of the magnetic field, wherein the third message comprises an indicator of a quality of a signal received by the sensor from the computing device;
determining, by the computing device, that the third measured strength of the magnetic field does not satisfy the original threshold; and
sending, from the computing device and to the user device, a fourth message indicating a false alarm condition, based on determining the reduction in the strength of the magnetic field.

* * * * *